United States Patent
Cho et al.

(10) Patent No.: US 11,474,723 B2
(45) Date of Patent: Oct. 18, 2022

(54) STORAGE DEVICE AND OPERATING METHOD THEREOF

(71) Applicant: SK hynix Inc., Icheon-si (KR)

(72) Inventors: Young Ick Cho, Icheon-si (KR); Byeong Gyu Park, Icheon-si (KR); Sung Kwan Hong, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 17/222,751

(22) Filed: Apr. 5, 2021

(65) Prior Publication Data
US 2022/0113870 A1 Apr. 14, 2022

(30) Foreign Application Priority Data
Oct. 8, 2020 (KR) .......................... 10-2020-0130351

(51) Int. Cl.
*G06F 3/06* (2006.01)
*G06F 12/02* (2006.01)

(52) U.S. Cl.
CPC ............ *G06F 3/064* (2013.01); *G06F 3/0604* (2013.01); *G06F 3/0631* (2013.01); *G06F 3/0656* (2013.01); *G06F 3/0679* (2013.01); *G06F 12/0246* (2013.01); *G06F 2212/7201* (2013.01)

(58) Field of Classification Search
None
See application file for complete search history.

(56) References Cited

FOREIGN PATENT DOCUMENTS

KR    10-1392174 B1    5/2013
KR    10-2033462 B1    7/2018

*Primary Examiner* — Kevin Verbrugge

(57) ABSTRACT

The storage device includes: a memory device including a plurality of user blocks and a system block; a buffer memory for storing a physical-to-logical table, and a memory controller for controlling the memory device to update map data stored in the system block, based on the physical-to-logical table, and to store the updated map data in the system block, after logical addresses of the physical-to-logical table are all allocated.

20 Claims, 18 Drawing Sheets

FIG. 4

P2L TABLE(MB1)

| PA | LA |
|---|---|
| PA1 | LA9 |
| PA2 | LA10 |
| PA3 | LA11 |
| PA4 | LA40 |
| PA5 | LA30 |
| PA6 | LA32 |
| PA7 | LA31 |
| PA8 | LA95 |
| PA9 | LA103 |
| PA10 | LA104 |

MAP UPDATE ⇒

L2P TABLE

| LA | PA |
|---|---|
| ⋮ | ⋮ |
| LA9 | PA1 |
| LA10 | PA2 |
| LA11 | PA3 |
| ⋮ | ⋮ |
| LA30 | PA5 |
| LA31 | PA7 |
| LA32 | PA6 |
| ⋮ | ⋮ |
| LA40 | PA4 |
| ⋮ | ⋮ |
| LA95 | PA8 |
| ⋮ | ⋮ |
| LA103 | PA9 |
| LA104 | PA10 |
| ⋮ | ⋮ |

STORAGE DEVICE AND OPERATING METHOD THEREOF

CROSS-REFERENCE TO RELATED APPLICATION

The present application claims priority under 35 U.S.C. § 119(a) to Korean patent application number 10-2020-0130351, filed on Oct. 8, 2020, in the Korean Intellectual Property Office, the entire disclosure of which is incorporated herein by reference.

BACKGROUND

1. Technical Field

The present disclosure generally relates to an electronic device, and more particularly, to a storage device and an operating method thereof.

2. Related Art

A storage device is a device that stores data under the control of a host. The storage device may include a memory device that stores data and a memory controller that controls the memory device. The memory device may be classified into volatile memory devices and nonvolatile memory devices.

A volatile memory device may store data while being supplied with power from a power supply. When the supply of power is interrupted, data stored in the volatile memory device may disappear. The volatile memory device may include, for example, a Static Random Access Memory (SRAM), a Dynamic Random Access Memory (DRAM), and the like.

A nonvolatile memory device may be a memory device in which data does not disappear even when the supply of power is interrupted. The nonvolatile memory device may include, for example, a Read Only Memory (ROM), a Programmable ROM (PROM), an Electrically Programmable ROM (EPROM), an Electrically Erasable ROM (EEROM), a flash memory, and the like.

SUMMARY

Embodiments provide a storage device that improves performance by decreasing a number of times memory blocks are checked to select a source block such as a victim block in a background operation such as garbage collection, and an operating method of the storage device.

In accordance with an aspect of the present disclosure, there is provided a storage device including: a memory device including a plurality of user blocks for storing data and a system block for storing map data representing a mapping relationship between a logical address of the data and a physical address at which the data is stored; a buffer memory configured to store a physical-to-logical table including mapping information regarding physical addresses, included in an open block from among the plurality of user blocks, and logical addresses that are allocated to the physical addresses in the open block; and a memory controller configured to control the memory device to update map data stored in the system block, after the logical addresses are all allocated, based on the mapping information in the physical-to-logical table, and configured to store the updated map data in the system block, wherein the memory controller: acquires an old mapping information of the logical addresses from the system block; generates old block information that distinguishes old blocks, from other user blocks in the plurality of user blocks, having old data corresponding to the logical addresses according to the old mapping information; and generates a non-candidate block information, based on the old block information, to flag user blocks to be excluded from use as a target block in a migration operation of moving data stored in the plurality of user blocks, based on the old block information.

In accordance with another aspect of the present disclosure, there is provided a method for operating a storage device including a memory device, a buffer memory, and a memory controller, the method including: performing map update of updating map data stored in the memory device based on a physical-to-logical table stored in the buffer memory; generating old block information using the physical-to-logical table and the updated map data to include information for distinguishing old blocks that are user blocks, in which old data corresponding to logical addresses from the physical-to-logical table stored, from among a plurality of user blocks included in the memory device; and generating non-candidate block information using the old block information for use in a migration operation of moving data stored in the plurality of user blocks.

In accordance with still another aspect of the present disclosure, there is provided a storage device including: a memory device including a plurality of user blocks for storing data and a system block for storing map data representing a mapping relationship between a logical address of the data and a physical address at which the data is stored; and a memory controller configured to generate old block information as information for identifying a user block, from among the plurality of user blocks, in which old data of logical addresses to be updated is stored, while a map update operation of updating the map data is being performed.

BRIEF DESCRIPTION OF THE DRAWINGS

Example embodiments will now be described more fully hereinafter with reference to the accompanying drawings; however, concepts disclosed herein may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIG. 4 is a diagram illustrating a map update operation in accordance with an embodiment of the present disclosure.

DETAILED DESCRIPTION

The specific structural or functional descriptions disclosed herein are merely illustrative for the purpose of describing embodiments according to the concepts of the present disclosure. The embodiments according to the concepts of the present disclosure can be implemented in various forms, and cannot be construed as limited to the embodiments set forth herein.

Figure 1:
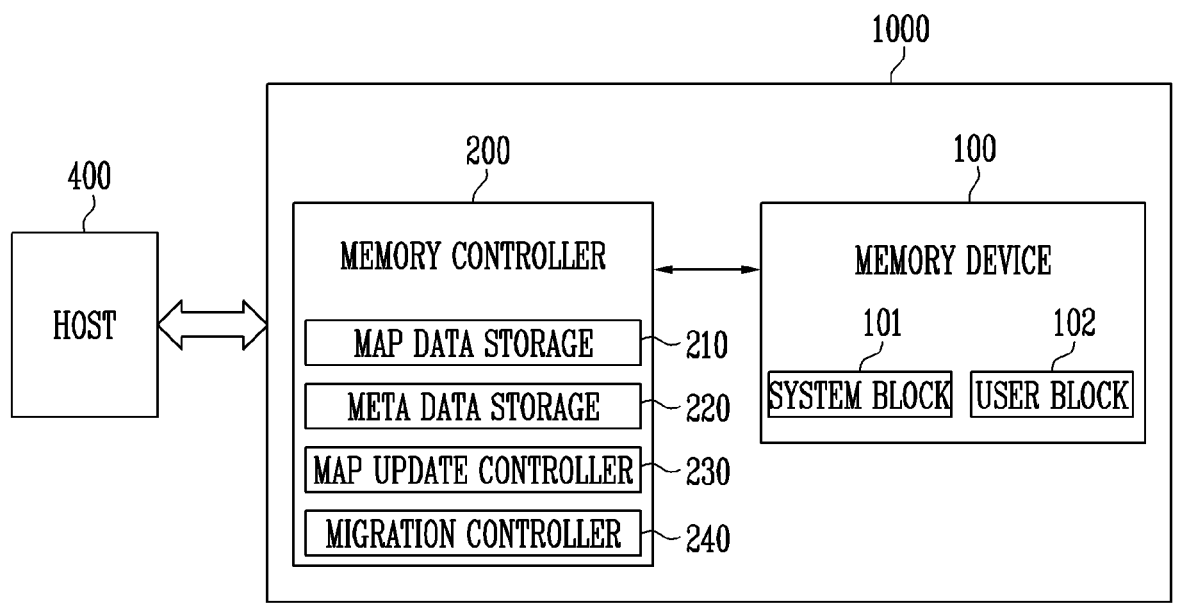
FIG. 1 is a diagram illustrating a storage system in accordance with an embodiment of the present disclosure.

FIG. 1 is a diagram illustrating a storage system in accordance with an embodiment of the present disclosure.

Referring to FIG. 1, a storage system may be implemented as a data processing system, including for example, a personal computer (PC), a data center, and an enterprise type data storage system, or a direct attached storage (DAS), a data processing system including a storage area network (SAN), a data processing system including a network attached storage, or the like.

The storage system may include a storage device 1000 and a host 400.

The storage device 1000 may be a device for storing data according to a request of the host 400, such as a mobile phone, a smart phone, an MP3 player, a laptop computer, a desktop computer, a game console, a TV, a tablet PC or an in-vehicle infotainment system.

The storage device 1000 may be manufactured as any one of various types of storage devices according to a host interface that is a communication scheme with the host 400. For example, the storage device 1000 may be implemented with any one of a variety of types of storage devices, such as a Solid State Drive (SSD), a Multi-Media Card (MMC), an Embedded MMC (eMMC), a Reduced Size MMC (RS-MMC), a micro-MMC (micro-MMC), a Secure Digital (SD) card, a mini-SD card, a micro-SD card, a Universal Serial Bus (USB) storage device, a Universal Flash Storage (UFS) device, a Compact Flash (CF) card, a Smart Media Card (SMC), a memory stick, and the like.

The storage device 1000 may be manufactured as any one of various kinds of package types. For example, the storage device 1000 may be manufactured as any one of various kinds of package types such as a Package-On-Package (POP), a System-In-Package (SIP), a System-On-Chip (SOC), a Multi-Chip Package (MCP), a Chip-On-Board (COB), a Wafer-level Fabricated Package (WFP), and a Wafer-level Stack Package (WSP).

The storage device 1000 may include a memory device 100 and a memory controller 200.

The memory device 100 may operate under the control of the memory controller 200. Specifically, the memory device 100 may receive a command and an address from the memory controller 200, and access a memory cell selected by the address from among memory cells (not shown). The memory device 100 may perform an operation indicated by the command on the memory cell selected by the address.

The command may be, for example, a program command, a read command, or an erase command, and the operation indicated by the command may be, for example, a program operation (or write operation), a read operation, or an erase operation.

The program operation may be an operation in which the memory device 100 stores write data provided from the host 400 under the control of the memory controller 200.

For example, the memory device 100 may receive a program command, an address, and data, and may program the data in a memory cell selected by the address. The data to be programmed in the selected memory cell may be defined as write data.

The read operation may be an operation in which the memory device 100 reads read data stored in the memory device 100 under the control of the memory controller 200.

For example, the memory device 100 may receive a read command and an address, and read data from an area selected by the address in a memory cell array (not shown). The data to be read from the selected area, from among data stored in the memory device 100, may be defined as read data.

The erase operation may be an operation in which the memory device 100 erases data stored in the memory device 100 under the control of the memory controller 200.

For example, the memory device 100 may receive an erase command and an address, and may erase data stored in an area selected by the address.

The memory device 100 may be implemented as a volatile memory device or a nonvolatile memory device.

For example, the volatile memory device may include a Double Data Rate Synchronous Dynamic Random Access Memory (DDR SDRAM), a Low Power Double Data Rate 4 (LPDDR4) SDRAM, a Graphics Double Data Rate (GDDR) SRAM, a Low Power DDR (LPDDR), a Rambus Dynamic Random Access Memory (RDRAM), a NAND flash memory, a vertical NAND flash memory, a NOR flash memory, a Resistive Random Access Memory (RRAM), a Phase-Change Random Access Memory (PRAM), a Magnetoresistive Random Access Memory (MRAM), a Ferroelectric Random Access Memory (FRAM), a Spin Transfer Torque Random Access Memory (STT-RAM), and the like.

For example, the nonvolatile memory device may include a flash memory. The flash memory may include a NAND flash memory, a vertical NAND flash memory, a NOR flash memory, and the like.

In this specification, for convenience of description, it is assumed that the memory device 100 is a NAND flash memory.

The memory device 100 may store write data under the control of the memory controller 200, or may read stored read data and provide the read data to the memory controller 200.

The memory device 100 may include a plurality of dies. One die may include at least one plane, and one plane may include a memory cell array including memory cells for storing write data (not shown).

The memory cell array may include a plurality of memory blocks (not shown). A memory block may be a unit for performing an erase operation of erasing data.

The plurality of memory blocks may be divided into a system block 101 and a user block 102.

The system block 101 may store map data, meta data, firmware information, etc. The map data may be data representing a mapping relationship between a logical address of data (or write data) and a physical address at which the data is stored. That is, the map data may be mapping information between logical and physical addresses. The map data may be managed in the form of a logical-to-physical table (i.e., L2P table). The meta data may be data representing information on data stored in a plurality of memory blocks or a plurality of user blocks 102. The firmware information may be information on firmware. A number of system blocks 101 may be one or more than one.

The user block 102 may store data. The data may be write data or user data, which is provided from the host 400. A number of user blocks 102 may be one or more than one.

The memory block may include a plurality of pages (not shown). A page may be a unit for performing a program operation of storing write data or a read operation of reading stored read data.

The memory controller 200 may control overall operations of the storage device 1000.

When power is applied to the storage device 1000, the memory controller 200 may execute firmware. When the memory device 100 is a flash memory device, the firmware may include a host interface layer, a flash translation layer, and a flash interface layer.

The host interface layer may control an operation between the host 400 and the memory controller 200.

The flash translation layer may translate a logical address provided from the host 400 into a physical address.

The flash interface layer may control communication between the memory controller 200 and the memory device 100.

The memory controller 200 may control the memory device 100 to perform a program operation, a read operation, and an erase operation respectively in response to a write request, a read request, and an erase request of the host 400.

In the program operation, the memory controller 200 may provide the memory device 100 with a program command, a physical address, and write data.

In the read operation, the memory controller 200 may provide the memory device 100 with a read command and a physical address.

In the erase operation, the memory controller 200 may provide the memory device 100 with an erase command and a physical address.

The memory controller 200 may autonomously generate a command, an address, and data regardless of, or independent of, any request provided from the host 400. The memory controller 200 may transmit the command, the address, and the data, which are autonomously generated, to the memory device 100.

For example, the memory controller 200 may generate a command for performing a background operation, an address, and data. Also, the memory controller 200 may provide the memory device 100 with the command, the address, and the data.

The background operation may be at least one of wear leveling, read reclaim, and garbage collection.

The wear leveling may mean, for example, static wear leveling, dynamic wear leveling, etc. The static wear leveling may mean an operation of storing a number of times memory blocks are erased and moving cold data, which is data seldom involved in an erase operation or a write operation, to a memory block which is erased a largest or a larger number of times of erasure. The dynamic wear leveling may mean an operation of storing a number of times memory blocks are erased, and programing data in a memory block which is erased a smallest or a lower number of times of erasure.

The read reclaim may mean an operation of moving data stored in a memory block to another memory block before an uncorrectable error occurs in the data stored in the memory block.

The garbage collection may mean an operation of copying valid data included in a bad block from among memory blocks to a free block, and erasing invalid data included in the bad block. If the valid data included in the bad block is copied to the free block, then the valid data included in the bad block may be moved to the free block.

As described above, an operation of moving data stored in a plurality of user blocks 102 may be defined as a migration operation.

In an embodiment, the migration operation may be an operation moving valid data stored in a specific memory block to another memory block when a background operation is performed.

In an embodiment, when it is determined that it is necessary to perform the background operation, the memory controller 200 may perform the migration operation.

For example, the memory controller 200 may control the memory device 100 to perform the migration operation within a period corresponding to that from after the memory controller 200 provides the host 400 with a response to a request (e.g., a write request, a read request, an erase request, or the like) provided from the host 400 to when the memory controller 200 receives a subsequent request, which is provided from the host 400.

In an embodiment, the memory controller 200 may include a map data storage 210, a meta data storage 220, a map update controller 230, and a migration controller 240.

The map data storage 210 may store map data. Specifically, the map data storage 210 may store a physical-to-logical table (i.e., P2L table) and a logical-to-physical table (i.e., L2P table).

The physical-to-logical table may be a table including mapping information between physical addresses included in an open block from among a plurality of user blocks 102 and logical addresses allocated to the physical addresses included in the open block.

The open block (not shown) may be a user block in which data provided by the host 400 can be stored from among the plurality of user blocks 102.

The logical-to-physical table may be a table including the above-described map data. The map data may be data representing a mapping relationship between a logical address of data provided from the host 400 and a physical address at which the data is stored.

The map data storage 210 will be described in detail later with reference to FIGS. 2 and 3.

The meta data storage 220 may store meta data. The meta data may be, for example, information representing a number of valid pages included in each of the plurality of user blocks 102 or information representing a number of times an erase operation is performed on each of the plurality of user blocks. However, the present disclosure is not limited thereto.

The meta data storage 220 will be described in detail later with reference to FIG. 5.

The map data storage 210 and the meta data storage 220 may be implemented with a buffer memory. Exemplarily, the buffer memory may be implemented as any one of a Double Data Rate Synchronous Dynamic Random Access Memory (DDR SDRAM), a Low Power Double Data Rate 4 (LPDDR4) SDRAM, a Graphics Double Data Rate (GDDR) SRAM, a Low Power DDR (LPDDR), a Rambus Dynamic Random Access Memory (RDRAM), a NAND flash memory, a vertical NAND flash memory, a NOR flash memory, a Resistive Random Access Memory (RRAM), a Phase-Change Random Access Memory (PRAM), a Magnetoresistive Random Access Memory (MRAM), a Ferroelectric Random Access Memory (FRAM), and a Spin Transfer Torque Random Access Memory (STT-RAM).

The map update controller 230 may perform a map update operation after logical addresses are all allocated to physical addresses included in an open block. Specifically, after the logical addresses are all allocated to the physical addresses included in the open block, the map update controller 230 may control the memory device 100 to update map data stored in the system block 101, based on the physical-to-logical table, and to store the updated map data in the system block 101.

In an embodiment, in a map update, the map update controller 230 may acquire old mapping information of logical addresses from the system block 101. The old mapping information may be map data before an update or mapping information before an update. For example, when map data representing mapping information between a first logical address and a first physical address is updated, the old mapping information may be mapping information between the first logical address and the first physical address before the update occurs.

In an embodiment, the map update controller 230 may generate old block information including information for distinguishing old blocks from user blocks except the old blocks among a plurality of user blocks 102 according to the old mapping information. The old block may be a user block including old data. The old data may be data stored in a user block including a physical address of map data before update. That is, the old data may be data to be processed as invalid data.

In an embodiment, the map update controller 230 may generate non-candidate block information, based on the old block information. The non-candidate block information may be information representing user blocks excluded from a target of a migration operation. The migration operation may be an operation of moving data stored in a plurality of user blocks 102.

In an embodiment, the map update controller 230 may generate old block information, such as information for identifying a user block, from among the plurality of user blocks 102, in which old data of logical addresses is to be updated, while a map update operation of updating map data is being performed.

The migration controller 240 may control the memory device 100 to perform a migration operation. Specifically, the migration controller 240 may select candidate blocks from among a plurality of user blocks, based on the non-candidate block information. Also, the migration controller 240 may control the memory device 100 to move, to a target block, valid data stored in a source block from among the candidate blocks.

The source block may be a user block for storing valid data having a size smaller than or equal to a predetermined reference size from among the plurality of user blocks 102. A number of source blocks may be one or more.

In an embodiment, the source block may be a user block in which cold data is stored in a static wear leveling operation. Alternatively, the source block may be a user block having a largest erase number of times in a dynamic wear leveling operation. Alternatively, the source block may be a victim block selected in garbage collection.

The target block may be a user block to which the valid data is to be moved among the plurality of user blocks 102.

In an embodiment, the target block may be a user block which is erased a largest number of times in the static wear leveling operation. Alternatively, the target block may be a user block which is erased a smallest number of times in the dynamic wear leveling operation. Alternatively, the target block may be a free block selected in the garbage collection.

The migration controller 240 may provide the memory device 100 with a migration read command for commanding the memory device 100 to read valid data stored in the source block. The memory device 100 may perform a migration read operation of reading the valid data stored in the source block in response to the migration read command. When the migration read operation is completed, the migration controller 240 may acquire the valid data that is read by the memory device 100.

The migration controller 240 may provide the memory device 100 with a migration write command for commanding the memory device 100 to store the valid data that is read in the target block. The memory device 100 may perform a migration write operation of storing the valid data in the target block in response to the migration write command.

The memory controller 200 may provide the host 400 with a response to a request provided by the host 400, and stand by until the memory controller 200 receives a subsequent request that the host 400 provides after the response is provided from the memory controller 200. The migration controller 220 may control the memory device 100 to perform a migration operation within a period corresponding to that from after the response is provided to the host 400 to when a subsequent request is received.

The memory controller 200 may control two or more memory devices 100. For example, the memory controller 200 may control the memory devices 100 according to an interleaving technique to improve operational performance.

The interleaving technique may be a technique for controlling operations on the two or more memory devices 100 to overlap with each other.

The host 400 may communicate with the storage device 1000 through an interface (not shown).

The interface may be implemented as a serial advanced technology attachment (SATA) interface, a SATA express (SATAe) interface, a serial attached small computer system (SAS) interface, a peripheral component interconnect express (PCIe) interface, a non-volatile memory express (NVMe) interface, an advanced host controller interface (AHCI), or a multimedia card interface, as non-limiting examples. However, the present disclosure is not limited thereto.

The host 400 may store write data in the storage device 1000, or communicate with the storage device 1000 to acquire read data stored in the storage device 1000.

In an embodiment, the host 400 may provide the storage device 1000 with a write request for requesting the storage device 1000 to store write data. Also, the host 400 may provide the storage device 1000 with a write request, write data, and a logical address for identifying the write data.

The storage device 1000 may store the write data provided by the host 400 in the memory device 100 and provide the host 400 with a response that the storing of the write data has been completed, in response to the write request provided from the host 400.

In an embodiment, the host 400 may provide the storage device 1000 with a read request for requesting the storage device 1000 to provide data stored in the storage device 1000 to the host 400. Also, the host 400 may provide a read request and a read address to the storage device 1000.

The storage device 1000 may read, from the memory device 100, read data corresponding to the read address provided by the host 400 and provide the host 400 with the read data as a response to the read request from the host 400.

Figure 2:
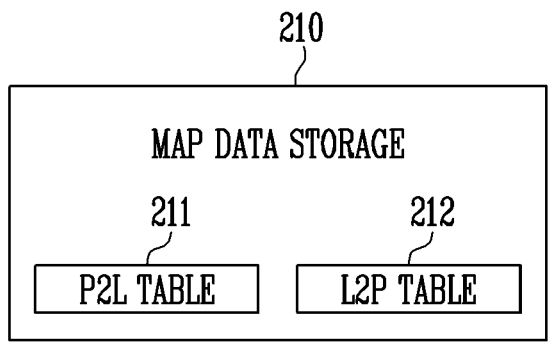
FIG. 2 is a diagram illustrating a map data storage in accordance with an embodiment of the present disclosure.

FIG. 2 is a diagram illustrating a map data storage in accordance with an embodiment of the present disclosure. FIG. 3 is a diagram illustrating a physical-to-logical table in accordance with an embodiment of the present disclosure.

Referring to FIGS. 1 and 2, the map data storage 210 may store a physical-to-logical table 211 and a logical-to-physical table 212.

The physical-to-logical table 211 may be a table including mapping information between physical addresses included in an open block from among a plurality of user blocks 102 and logical addresses allocated the physical addresses included in the open block.

Figure 3:
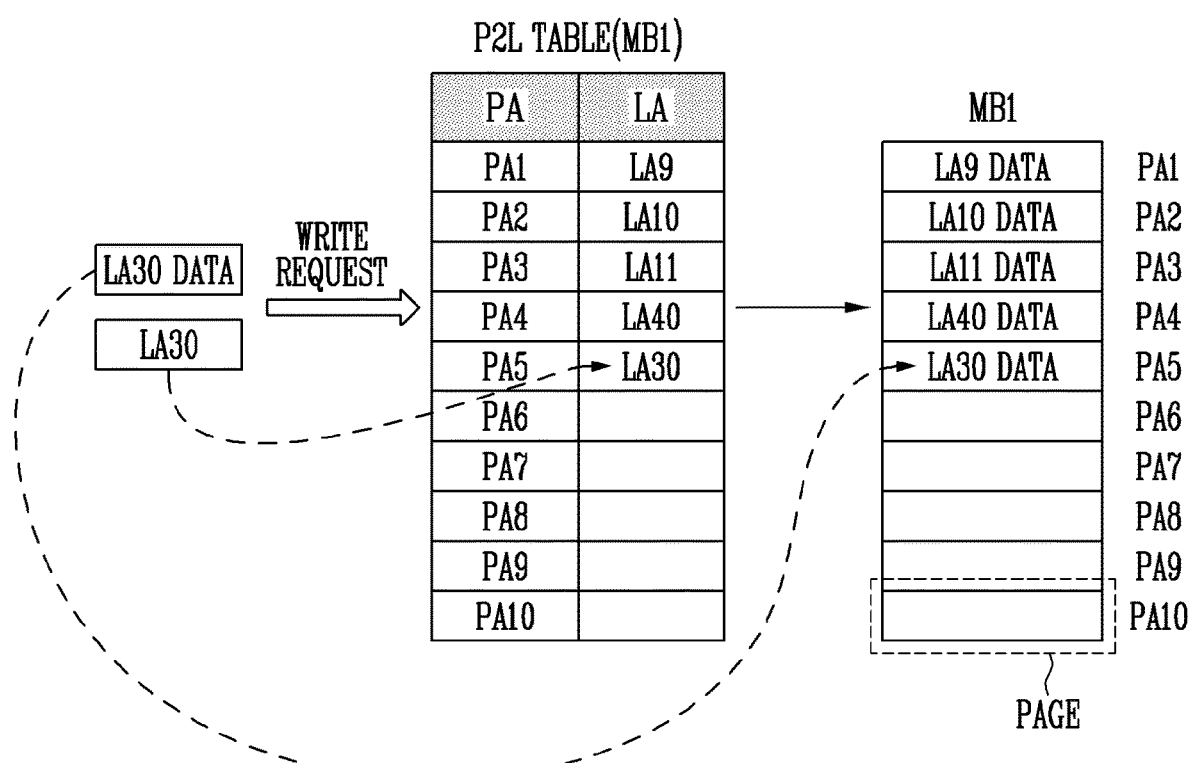
FIG. 3 is a diagram illustrating a physical-to-logical table in accordance with an embodiment of the present disclosure.

Referring to FIGS. 1 to 3, it is assumed that a first user block MB1 is an open block. Also, it is assumed that physical addresses included in the first user block MB1 are physical addresses of a page. Also, it is assumed that a number of all physical addresses PA1 to PA10 included in the first user block MB1 is 10.

A physical-to-logical table shown in FIG. 3 may include mapping information between physical addresses PA1 to PA4 included in the first user block MB1 and logical addresses LA9, LA10, LA11, and LA40 allocated to the physical addresses PA1 to PA4.

The first user block MB1 is an open block, so logical addresses may not be allocated to the other physical addresses PA5 to PA10, while the physical addresses PA1 to PA4, to which the logical addresses LA9, LA10, LA11, and LA40 are allocated from among all the physical addresses PA1 to PA10, are included in the first user block MB1.

The host 400 may provide the storage device 1000 with a write request, a thirtieth logical address LA30, and write data LA30 DATA of the thirtieth logical address LA30. The thirtieth logical address LA30 may be allocated to a fifth physical address PA5 included in the physical-to-logical table shown in FIG. 3. In addition, the write data LA30 DATA of the thirtieth logical address LA30 may be stored at the fifth physical address PA5 in the first user block MB1.

Referring to FIGS. 1 and 2, the map data storage 210 may store the logical-to-physical table 212 to be updated in a map update operation. The logical-to-physical table 212 may be a table including map data loaded from the system block 101. In an embodiment, the logical-to-physical table 212, among the logical-to-physical tables stored in the system block 101, may be a table to be corrected according to the physical-to-logical table 211 stored in the map data storage 210.

In an embodiment, the map update controller 230 may load a portion of map data stored in the system block 101 to the map data storage 210. The portion of the map data, which is loaded to the map data storage 210, may be managed in the form of a table identical to the logical-to-physical table 212.

A data write operation may be immediately performed through the map data storage 210 without referring to the system block 101. Thus, the speed of the data write operation can be improved.

The map data stored in the system block 101 may be divided into a plurality of logical-physical segments. Each logical-physical segment may include a plurality of map entries including a logical address and a physical address corresponding to the logical address. Accordingly, the logical-to-physical table 212 stored in the map data storage 210 may include some logical-physical segments from among the plurality of logical-physical segments.

When logical addresses are all allocated to physical addresses included in the physical-to-logical table 211, the map update controller 230 may perform a map update operation of controlling the memory device 100 to update the logical-to-physical table 212, based on the physical-to-logical table 211, and to store the updated logical-to-physical table 212 in the system block 101.

FIG. 4 is a diagram illustrating a map update operation in accordance with an embodiment of the present disclosure.

In the embodiment shown in FIG. 4, for convenience of description, it is assumed that a physical-to-logical table shown in FIG. 4 is the physical-to-logical table shown in FIG. 3. Also, it is assumed that a logical-to-physical table shown in FIG. 4 illustrates a portion of map data stored in the system block 101.

When an open block becomes a closed block, the map update controller 230 may perform a map update operation. The closed block may be a user block that is entirely written.

The map update controller 230 may correct map data included in the logical-to-physical table, based on logical addresses of write data received from the host 400.

An example will be described with reference to FIG. 4. Logical addresses LA9 to LA11, LA40, LA30, LA32, LA31, LA95, LA103, and LA104 of write data may be respectively allocated to physical addresses PA1 to PA10 included in the physical-to-logical table. In the logical-to-physical table, physical addresses corresponding to the logical addresses LA9 to LA11, LA40, LA30, LA32, LA31, LA95, LA103, and LA104 of the write data may be changed to the physical addresses PA1 to PA10 of the physical-to-logical table.

The map update controller 230 may provide the memory device 100 with a program command for commanding the memory device 100 to store the corrected map data in the system block 101. The memory device 100 may perform a program operation of storing the corrected map data in the system block 101, in response to the program command.

Existing map data corresponding to the corrected map data from among the map data stored in the system block 101 may be processed as invalid data.

Figure 5:
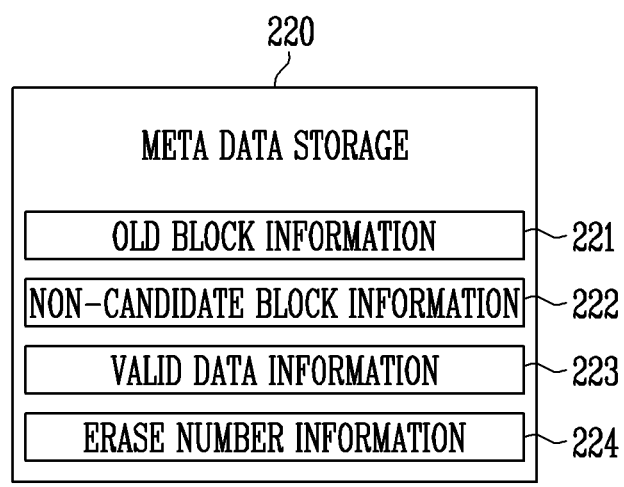
FIG. 5 is a diagram illustrating a meta data storage in accordance with an embodiment of the present disclosure.

FIG. 5 is a diagram illustrating a meta data storage in accordance with an embodiment of the present disclosure.

Referring to FIG. 5, a meta data storage 220 may include meta data. Specifically, the meta data storage 220 may include old block information 221, non-candidate block information 222, valid data information 223, and erase number information 224.

The old block information 221 may include information for distinguishing old blocks from other user blocks from among a plurality of user blocks 102.

The non-candidate block information 222 may be information representing non-candidate blocks in a migration operation. A non-candidate block may be a user block to be excluded from a source block from among the plurality of user blocks 102. For example, the non-candidate block may be a block in which a valid page number included in the non-candidate block that will soon decrease. In such an instance, when the non-candidate block is selected as the source block, it is likely that valid data stored in the non-candidate block will be processed as invalid data even after the valid data is moved to a target block. Therefore, the efficiency of the migration operation may be deteriorated.

The valid data information 223 may be information on valid data included in each of the user blocks 102. For example, the valid data information 223 may be information representing whether data included in the plurality of user blocks 102 is valid or invalid. Alternatively, the valid data information 223 may be information representing a valid page number included in each of the plurality of user blocks 102.

The erase number information 224 may be information on a number of times each of the plurality of user blocks 102 is erased. For example, the erase number information 224 may be information representing a number of times that each of the plurality of user blocks 102 is erased.

Although not shown in the drawing, the meta data storage 220 may further include read number information on a number of times that each of the plurality of user blocks 102 is read.

Figure 6:
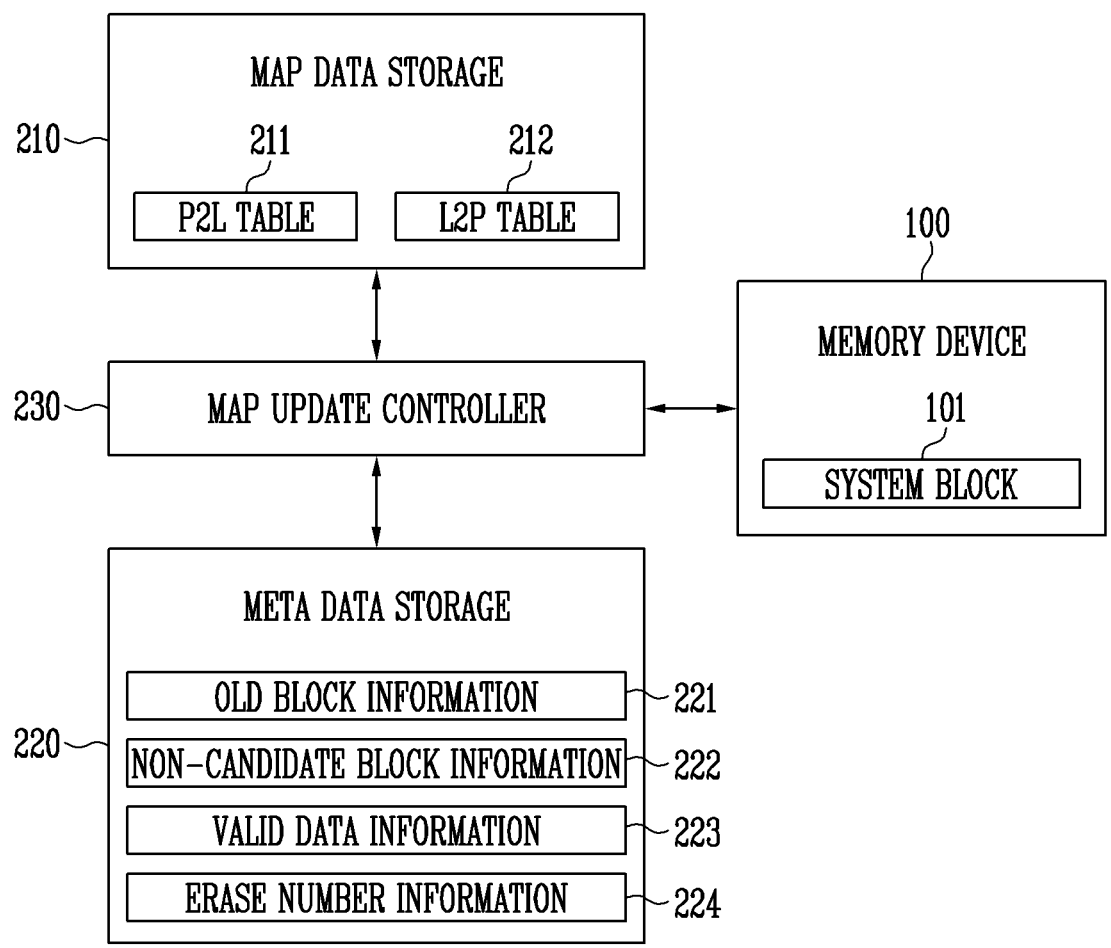
FIG. 6 is a diagram illustrating a map update controller in accordance with an embodiment of the present disclosure.
Figure 7:
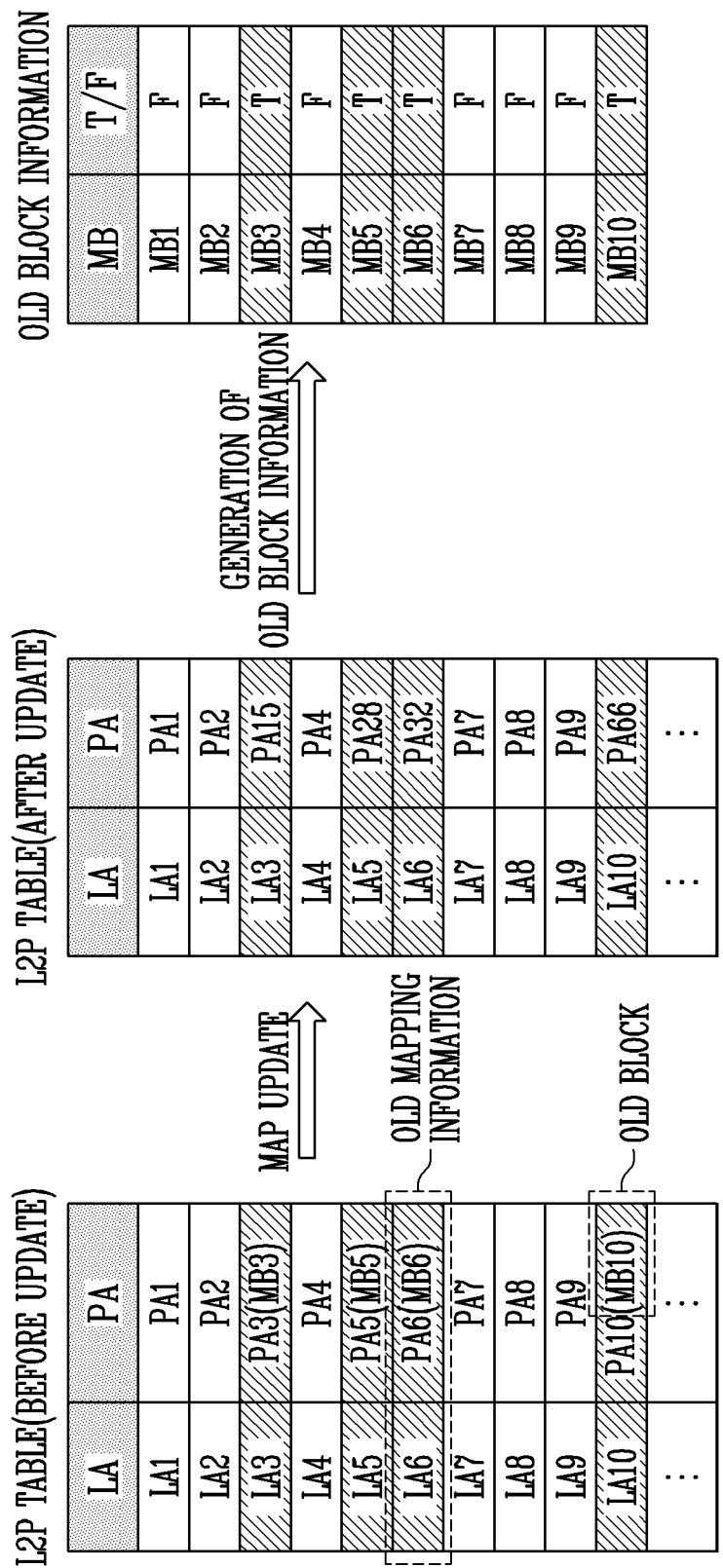
FIG. 7 is a diagram illustrating a method for generating old block information in accordance with an embodiment of the present disclosure.
Figure 8:
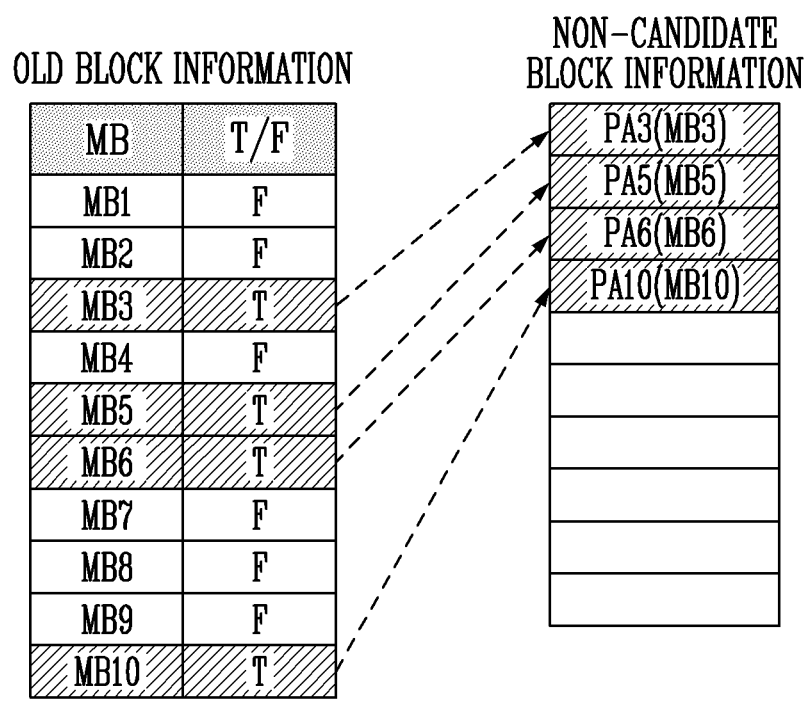
FIG. 8 is a diagram illustrating a method for generating non-candidate block information in accordance with an embodiment of the present disclosure.

FIG. 6 is a diagram illustrating a map update controller in accordance with an embodiment of the present disclosure. FIG. 7 is a diagram illustrating a method for generating old block information in accordance with an embodiment of the present disclosure. FIG. 8 is a diagram illustrating a method for generating non-candidate block information in accordance with an embodiment of the present disclosure.

In an embodiment shown in FIGS. 6 to 8, for convenience of description, it is assumed that a number of a plurality of user blocks 102 is 10.

Referring to FIG. 6, a map update controller 230 may perform a map update operation, based on a physical-to-logical table 211 and a logical-to-physical table 212.

For example, the map update controller 230 may load the whole or a portion of map data stored in the system block 101, and store the loaded map data in the map data storage 210. The map data stored in the map data storage 210 may be managed as the logical-to-physical table 212. In the logical-to-physical table 212, the map update controller 230 may change physical addresses, from the physical addresses that correspond to logical addresses in the logical-to-physical table 212, to the physical addresses in the physical-to-logical table 211 that correspond to logical addresses that match the logical addresses in the logical-to-physical table 212. The map update controller 230 may provide the memory device 100 with a program command for commanding the memory device 100 to store the changed logical-to-physical table 212 in the system block 101, based on a physical address of the system block 101 and map data (or mapping information) that was changed in the logical-to-physical table 212.

An example will be described in detail with reference to FIG. 7. In this example, third, fifth, sixth, and tenth physical addresses PA3, PA5, PA6, and PA10 respectively corresponding to third, fifth, sixth, and tenth logical addresses LA3, LA5, LA6, and LA10 in the logical-to-physical table 212 before update will be updated. Physical addresses respectively corresponding to the third, fifth, sixth, and tenth logical addresses LA3, LA5, LA6, and LA10 in the logical-to-physical table 212 after update may be fifteenth, twenty-eighth, thirty-second, and sixty-sixth physical addresses PA15, PA28, PA32, and PA66.

In the map update, the map update controller 230 may acquire old mapping information of logical addresses from the system block 101. The map update controller 230 may generate old block information according to the old mapping information.

For example, the map update controller 230 may acquire old mapping information in the logical-to-physical table 212 before update, check user blocks respectively including physical addresses included in the old mapping information, and generate, as the old block information, information representing the checked user blocks.

An example will be described with reference to FIGS. 6 and 7.

The old mapping information may be mapping information of the third logical address LA3 and the third physical address PA3, mapping information of the fifth logical address LA5 and the fifth physical address PA5, mapping information of the sixth logical address LA6 and the sixth physical address PA6, and mapping information of the tenth logical address LA10 and the tenth physical address PA10 in the logical-to-physical table 212 before update.

An example will be described with reference to FIG. 7. It is assumed that the third physical address PA3 is included in a third user block MB3, the fifth physical address PA5 is included in a fifth user block MB5, the sixth physical address PA6 is included in a sixth user block MB6, and the tenth physical address PA10 is included in a tenth user block MB10. The third, fifth, sixth, and tenth user blocks MB3, MB5, MB6, and MB10 may be old blocks. Accordingly, old block information representing the third, fifth, sixth, and tenth user blocks MB3, MB5, MB6, and MB10 may be generated.

In an embodiment, the old block information may be bitmap data representing, as one bit, whether each of the plurality of user blocks 102 is an old block. An example will be described with reference to FIG. 7. An old block from among a plurality of user blocks MB1 to MB10 may be stored with information representing True T, and a user block that is not an old block may have information stored that represents False F. Specifically, the third, fifth, sixth, and tenth user blocks MB3, MB5, MB6, and MB10, as the old blocks among the plurality of user blocks MB1 to MB10, may have old block information representing True T, and the other user blocks MB1, MB2, MB4, and MB7 to MB10 may have old block information representing False F.

The map update controller 230 may generate non-candidate block information, based on the old block information.

An example will be described with reference to FIG. 8. The map update controller 230 may scan the old block information, and generate, as the non-candidate block information, the third, fifth, sixth, and tenth physical addresses PA3, PA5, PA6, and PA10 respectively included in the third, fifth, sixth, and tenth user blocks MB3, MB5, MB6, and MB10 with True T from among the plurality of user blocks MB1 to MB10.

In an embodiment, the non-candidate block information may be managed as a data structure in a queue form as shown in FIGS. 7 and 8. However, the present disclosure is not limited thereto.

In the embodiments shown in FIGS. 7 and 8, it has been described that the information representing True T is information representing an old block, and that the information representing False F is information representing a user block that is not an old block. However, the present disclosure is not limited thereto. Although not shown in the drawings, the information representing True T may be information representing the user block not an old block instead of the old block, and the information representing False F may be information representing the old block.

Although not shown in the drawings, the information representing True T or False F may be expressed as one-bit data. For example, the information representing True T may be expressed as 0, and the information representing False F may be expressed as 1. However, the present disclosure is not limited thereto. The information representing True T may be expressed as 1, and the information representing False F may be expressed as 0.

Figure 9:
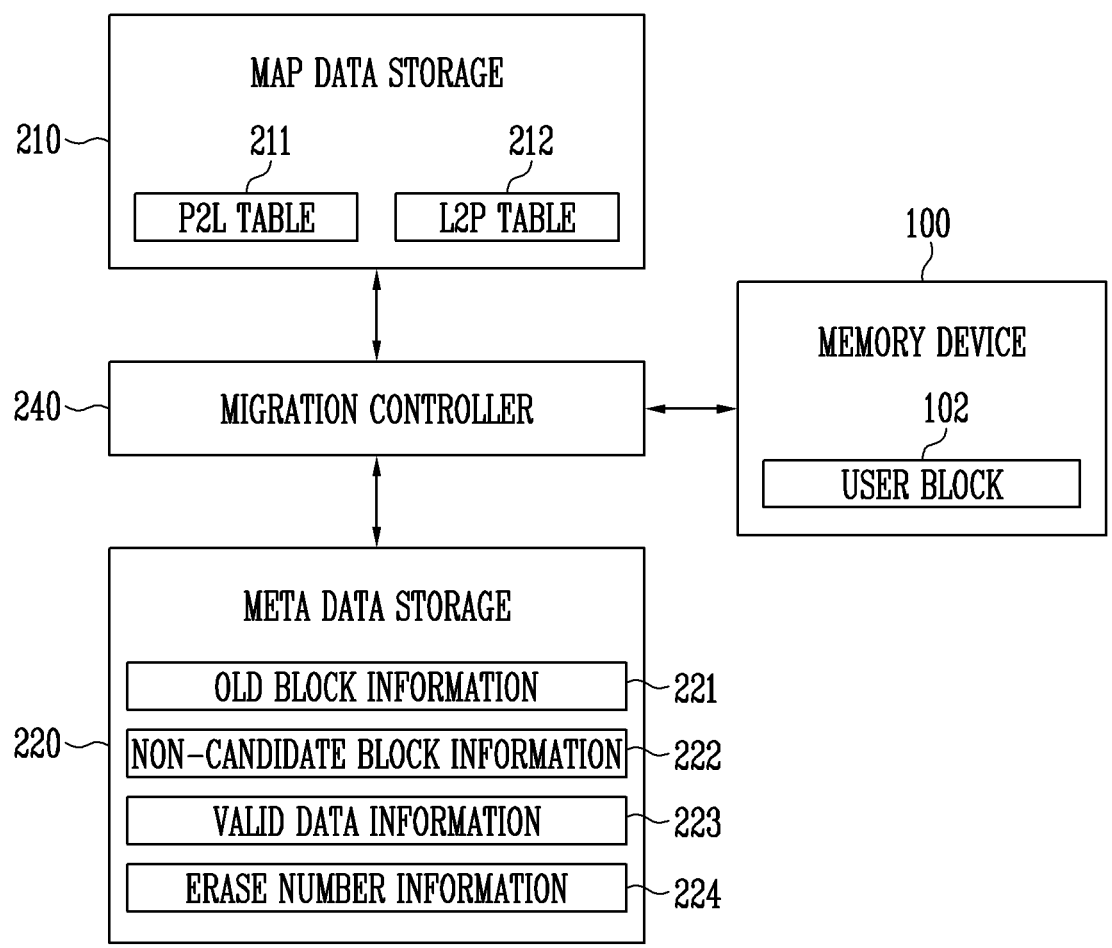
FIG. 9 is a diagram illustrating a migration controller in accordance with an embodiment of the present disclosure.
Figure 10:
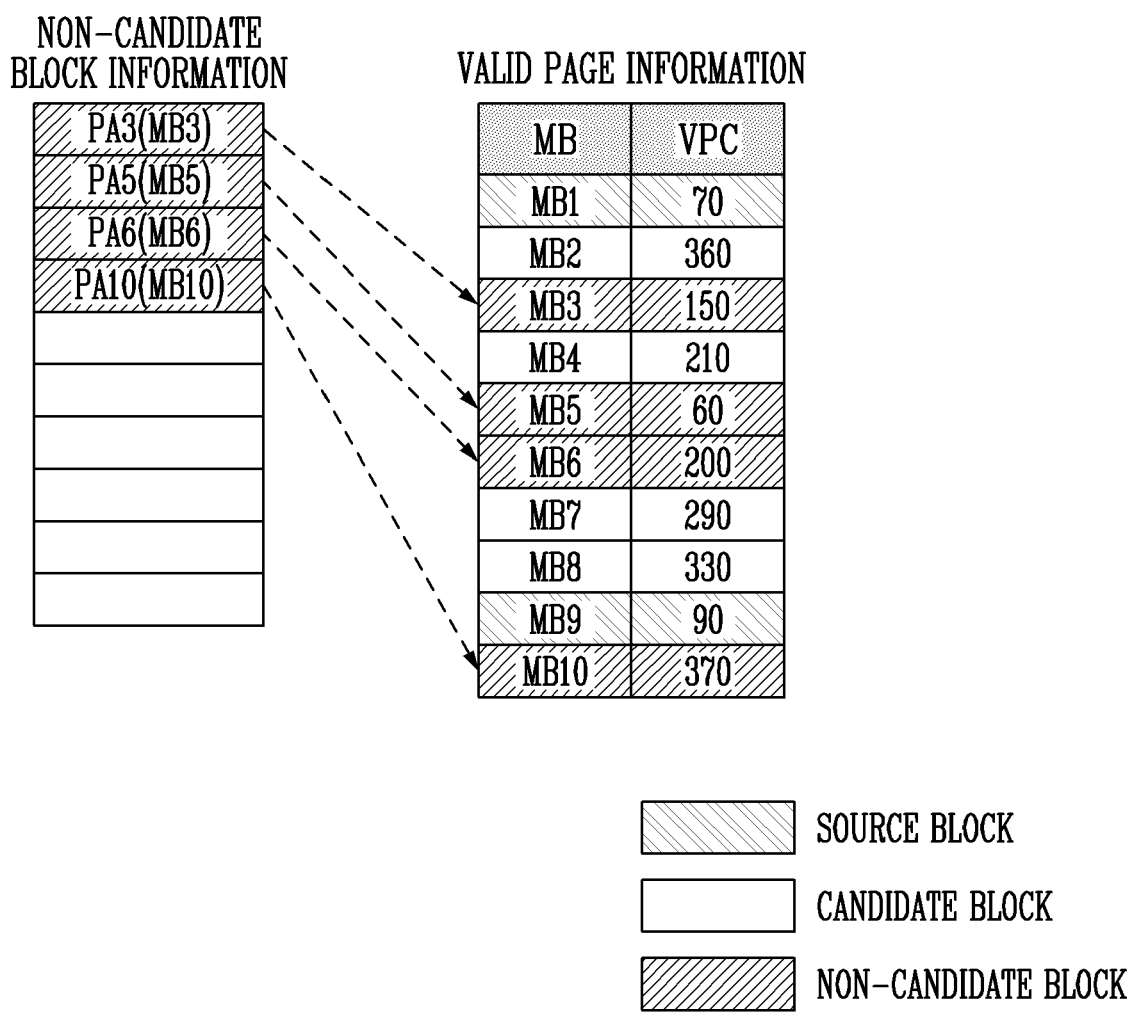
FIG. 10 is a diagram illustrating a method for selecting a source block in accordance with an embodiment of the present disclosure.
Figure 11:
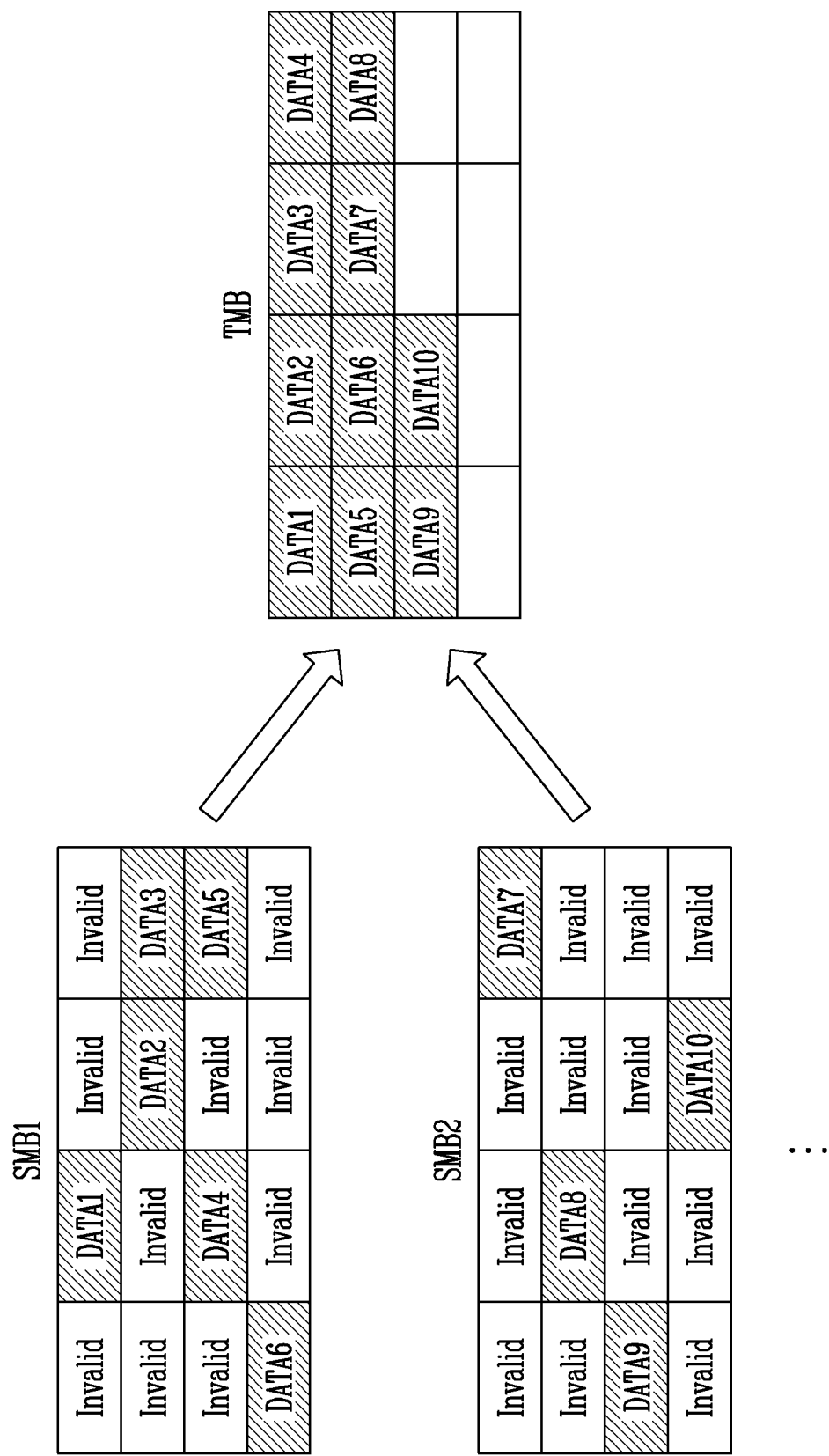
FIG. 11 is a diagram illustrating a migration operation in accordance with an embodiment of the present disclosure.

FIG. 9 is a diagram illustrating a migration controller in accordance with an embodiment of the present disclosure. FIG. 10 is a diagram illustrating a method for selecting a source block in accordance with an embodiment of the present disclosure. FIG. 11 is a diagram illustrating a migration operation in accordance with an embodiment of the present disclosure.

Referring to FIG. 9, a migration controller 240 may control a memory device 100 to perform a migration operation, based on a non-candidate information 222 and a valid data information 223. Alternatively, the migration controller 240 may control the memory device 100 to perform a migration operation, based on the non-candidate block information 222 and an erase number information 224.

The migration controller 240 may determine candidate blocks and non-candidate blocks, from among a plurality of user blocks 102, based on the non-candidate block information 222.

An example will be described with reference to FIG. 10. The migration controller 240 may determine, as non-candidate blocks, third, fifth, sixth, and tenth user blocks MB3, MB5, MB6, and MB10 from among a plurality of user blocks MB1 to MB10. Also, the migration controller 240 may determine, as candidate blocks, first, second, fourth, seventh, eighth, and ninth user blocks MB1, MB2, MB4, MB7, MB8, and MB9 from among the plurality of user blocks MB1 to MB10.

In an embodiment, the migration controller 240 may select a source block from among the candidate blocks, based on the valid data information 223. The valid data information 223 may be, for example, valid page information, which may be information representing a valid page number included in each of the plurality of user blocks 102.

For example, the migration controller 240 may select, as the source block, a candidate block having a valid page number smaller than a predetermined reference valid page number, based on the valid page information.

An example will be described with reference to FIG. 10. Information representing a valid page number VPC for each of the plurality of user blocks MB1 to MB10 is stored in the valid page information. Valid page numbers VPC of the first, second, fourth, seventh, eighth, and ninth user blocks MB1, MB2, MB4, MB7, MB8, and MB9, which are determined as the candidate blocks, may be 70, 360, 210, 290, 330, and 90, respectively. Assuming that the predetermined reference valid page number is 100, user blocks having valid page numbers VPC smaller than the reference valid page number from among the first, second, fourth, seventh, eighth, and ninth user blocks MB1, MB2, MB4, MB7, MB8, and MB9 may be the first and ninth user blocks MB1 and MB9. Therefore, the first and ninth user blocks MB1 and MB9 may be selected as source blocks.

In an embodiment, the source block, from among the candidate blocks, may be a victim block selected in garbage collection.

In an embodiment, the migration controller 240 may select a source block from among the candidate blocks, based on the erase number information 224.

For example, the migration controller 240 may select, as source blocks, candidate blocks that have been erased number of times greater than a predetermined reference erase number of times, from among the candidate blocks based on the valid page information.

Although not shown in the drawing, assuming that the valid page number VPC shown in FIG. 10 is the erase number information 224, a user block having a largest erase number of times from among the first, second, fourth, seventh, eighth, and ninth user blocks MB1, MB2, MB4, MB7, MB8, and MB9 may be the second user block MB2, which is determined to be a candidate block. Therefore, the second user block MB2 may be selected as a source block.

In an embodiment, the source block may be a memory block having a largest erase number of times in a wear leveling operation from among the candidate blocks.

Referring to FIG. 9, when at least one source block is selected, the migration controller 240 may provide the memory device 100 with a physical address of the source block and a read command for commanding the memory device 100 to read valid data stored in the source block.

When the valid data stored in the source block is provided to the memory controller 200, the migration controller 240 may provide the memory device 100 with a physical address of a target block, a program command for commanding the memory device 100 to store the valid data to the target block, and the valid data.

Referring to FIG. 11, the migration controller 240 may control the memory device 100 to move valid data DATA1 to DATA10 stored in source blocks SMB1 and SMB2 to a target block TMB.

An example will be described with reference to FIG. 11. The migration controller 240 may control the memory device 100 to perform a migration read operation. When the migration read operation is performed, the valid data DATA1 to DATA10 stored in the source blocks SMB1 and SMB2 may be read by the memory device 100. When the migration read operation is completed, the valid data DATA1 to DATA10 stored in the source blocks SMB1 and SMB2 may be provided to the memory controller 200. When the valid data DATA1 to DATA10 stored in the source blocks SMB1 and SMB2 is provided to the memory controller 200, the migration controller 240 may control the memory device 100 to perform a migration write operation. When the migration write operation is performed, the read valid data DATA1 to DATA10 may be stored in the target block TMB by the memory device 100.

In an embodiment, the target block TMB may be a free block selected in garbage collection from among the plurality of user blocks 102.

In an embodiment, the target block TMB may be a user block having a smallest erase number of times in a wear leveling operation from among the plurality of user blocks 102.

Figure 12:
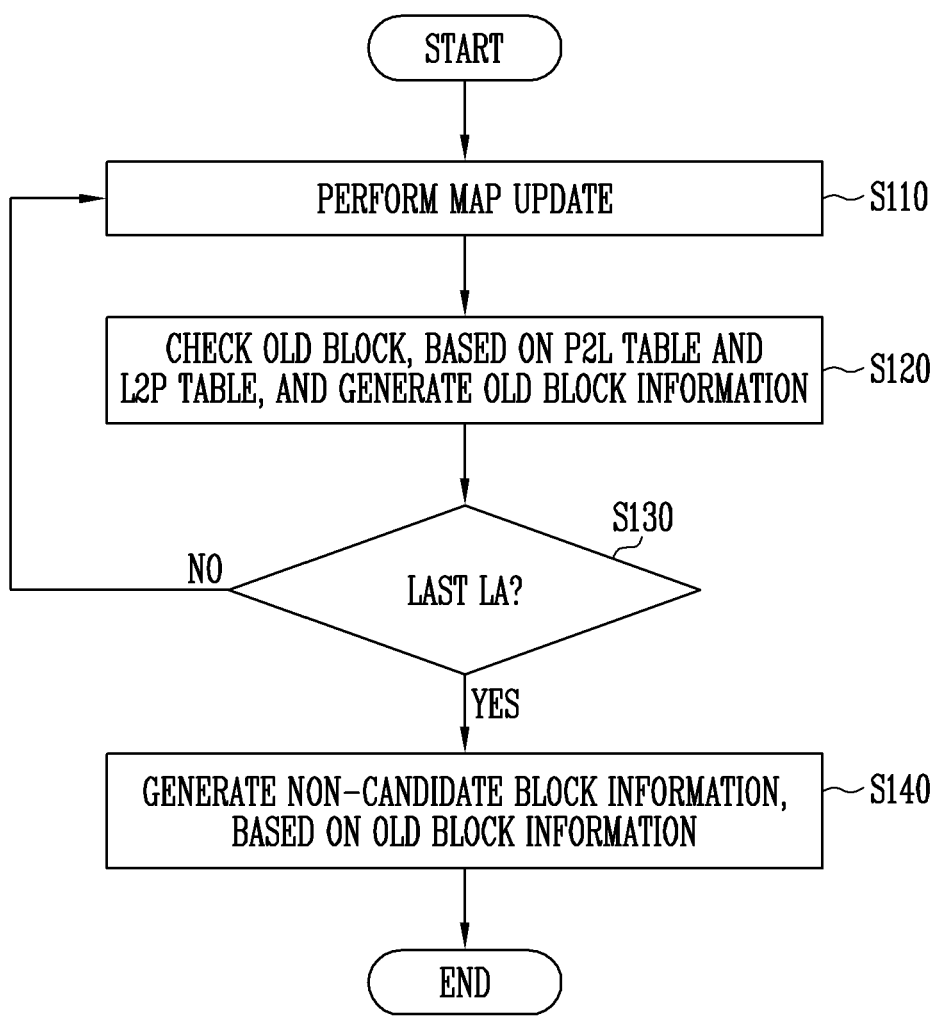
FIGS. 12 and 13 are diagrams illustrating an operating method of a storage device in accordance with an embodiment of the present disclosure.
Figure 13:
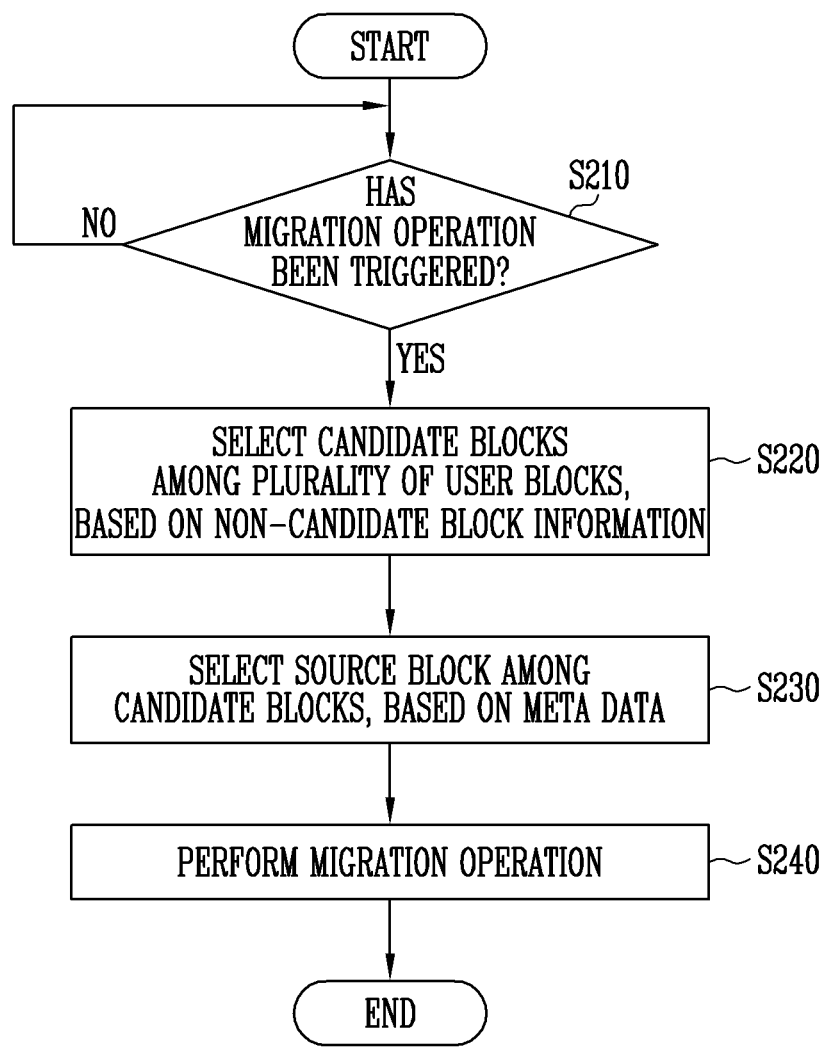

FIGS. 12 and 13 are diagrams illustrating an operating method of a storage device in accordance with an embodiment of the present disclosure.

A flowchart shown in FIG. 12 is used to describe a method in which a storage device in accordance with an embodiment of the present disclosure generates a non-candidate block information 222 in a map update operation.

Referring to FIG. 12, a storage device 1000 performs a map update for updating map data stored in a memory device 100, based on a physical-to-logical table 211 stored in a buffer memory (S110).

Specifically, for example, the storage device 1000 may allocate logical addresses to physical addresses included in an open block from among a plurality of user blocks 102 in the physical-to-logical table 211. The storage device 1000 may update map data read by the memory device 100, based on the physical-to-logical table 211, after the logical addresses are all allocated to the physical addresses included in the open block. The storage device 1000 may store the updated map data in the memory device 100.

The storage device 1000 check the old block, based on the physical-to-logical table 211 and a logical-to-physical table 212 that includes the updated map data, and generates the old block information 221. (S120).

The old block information 221 may include information for distinguishing old blocks other from other user blocks from among the plurality of user blocks 102. The old blocks may be user blocks in which old data corresponding to logical addresses allocated to physical addresses included in the physical-to-logical table 211 is stored.

In an embodiment, the storage device 1000 may acquire old mapping information of the logical addresses from the memory device 100. Also, the storage device 1000 may generate, as the old block information 221, information representing a user block corresponding to an old block, according to the old mapping information.

In an embodiment, the storage device 1000 may generate, as the old block information 221, bitmap data representing, as one bit, whether each of the plurality of user blocks 102 is an old block.

The storage device 1000 checks whether a logical address at which a map update is to be performed is a last logical address of map data stored in the system block 101 (S130).

When the logical address is the last logical address (S130, YES), the storage device 1000 may generate the non-candidate block information 222, based on the old block information 221 (S140). The non-candidate block information 222 may be information representing user blocks excluded from candidate blocks that can be selected as a target of a migration operation, e.g., source blocks.

When the logical address is not the last logical address (S130, NO), the method may be repeated from step S110.

A flowchart shown in FIG. 13 is used to describe a method in which a storage device 1000 in accordance with an embodiment of the present disclosure performs a migration operation.

Referring to FIG. 13, a storage device 1000 may detect whether a migration operation has been triggered (S210). A background operation may be performed at step 210. That the migration operation is triggered may mean detecting that a background operation is performed.

Step 210 may be repeated until the migration operation is triggered (i.e., S210, YES).

When the migration operation is triggered (S210, YES), the storage device 1000 may select candidate blocks from among a plurality of user blocks 102, based on a non-candidate block information 222, in response to the migration operation (S220).

Specifically, for example, the storage device 1000 may select, as the candidate blocks, other user blocks, except non-candidate blocks included in the non-candidate block information 222, from among the plurality of user blocks 102.

The storage device 1000 selects a source block from among a plurality of candidate blocks, based on meta data (S230). The meta data may include, for example, a valid data information 223 on valid data stored in the plurality of user blocks 102. Also, the meta data may include, for example, the erase number information regarding a number of times that each of the plurality of user blocks 102 is erased.

In an embodiment, the storage device 1000 may select, as the source block, a candidate block having a valid page number that is smaller than a predetermined reference valid page number, based on information representing a valid page number for each of the plurality of user blocks 102.

In an embodiment, the storage device 1000 may select, as the source block, a candidate block having a number of times of erasure that is greater than a predetermined reference erase number of times, based on information on the number of times each of the plurality of user blocks 102 is erased.

The storage device 1000 performs a migration operation of moving stored valid data from the selected source block to a target block (S240).

Figure 14:
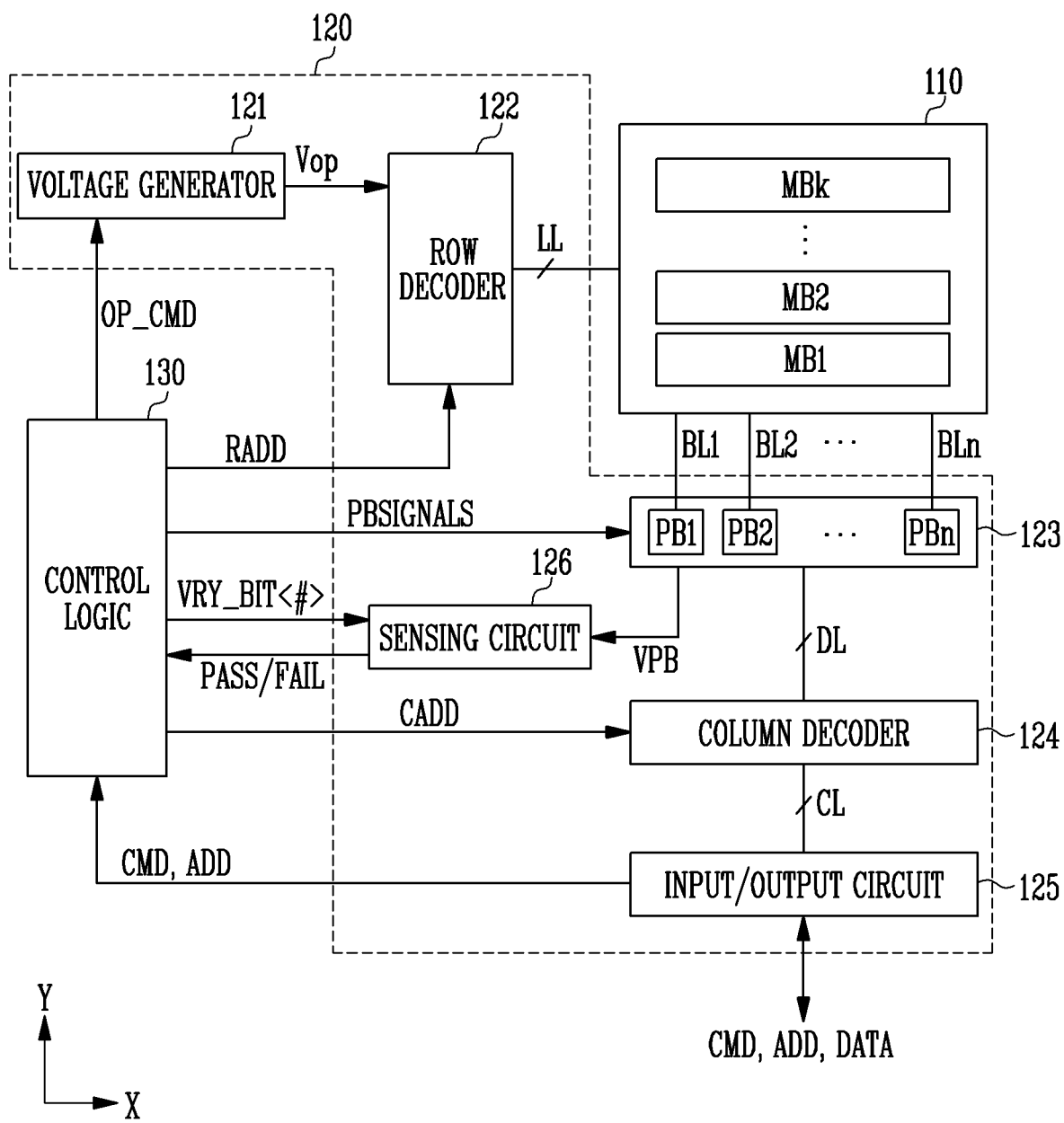
FIG. 14 is a diagram illustrating a memory device in accordance with an embodiment of the present disclosure.

FIG. 14 is a diagram illustrating a memory device in accordance with an embodiment of the present disclosure.

Referring to FIG. 14, a memory device 100 may include a memory cell array 110, a peripheral circuit 120, and a control logic 130.

The memory cell array 110 may include a plurality of memory blocks MB1 to MBk (where k is a positive integer). The number of the plurality of memory blocks MB1 to MBk is merely an example for describing embodiments of the present disclosure, and the present disclosure is not limited thereto.

Each of the memory blocks MB1 to MBk may be connected to local lines LL and bit lines BL1 to BLn (where n is a positive integer).

The local lines LL may be connected to a row decoder 122.

The local lines LL may be connected to each of the memory blocks MB1 to MBk.

Although not shown in FIG. 14, the local lines LL may include a first select line, a second select line, and a plurality of word lines arranged between the first select line and the second select line.

Although not shown in the drawing, the local lines LL may further include dummy lines arranged between the first select line and the word lines, dummy lines arranged between the second select line and the word lines, and pipe lines.

The bit lines BL1 to BLn may be commonly connected to the memory blocks MB1 to MBk.

The memory blocks MB1 to MBk may be implemented in a two-dimensional or three-dimensional structure.

For example, memory cells in the memory blocks MB1 to MBk having a two-dimensional structure may be arranged in a direction parallel to a substrate. This will be described later with reference to FIG. 15.

For example, memory cells in the memory blocks MB1 to MBk having a three-dimensional structure may be stacked in a direction vertical to a substrate layer.

The peripheral circuit 120 may include a voltage generator 121, the row decoder 122, a page buffer group 123, a column decoder 124, an input/output circuit 125, and a sensing circuit 126.

The voltage generator 121 may generate various operating voltages Vop used for a program operation, a read operation, and an erase operation in response to an operation command OP_CMD. Also, the voltage generator 121 may selectively discharge the local lines LL in response to the operation command OP_CMD. For example, the voltage generator 121 may generate a program voltage, a verify voltage, pass voltages, a turn-on voltage, a read voltage, an erase voltage, a source line voltage, and the like under the control of the control logic 130.

In an embodiment, the voltage generator 121 may generate an internal power voltage by regulating external power voltage. The internal power voltage generated by the voltage generator 121 may be used as an operating voltage of the memory device 100.

In an embodiment, the voltage generator 121 may generate a plurality of voltages by using the external power voltage or the internal power voltage. For example, the voltage generator 121 may include a plurality of pumping capacitors for receiving the internal power voltage, and generate a plurality of voltages by selectively activating the plurality of pumping capacitors under the control of the control logic 130. The plurality of generated voltages may be supplied to the memory cell array 110 by the row decoder 122.

The row decoder 122 may transfer the operating voltages Vop to the local lines LL in response to a row address RADD. The operating voltages Vop may be transferred to a selected memory block from among the memory blocks MB1 to MBk through the local lines LL.

For example, in a program operation, the row decoder 122 may apply a program voltage to a selected word line, and apply a program pass voltage having a level lower than that of the program voltage to unselected word lines. In a program verify operation, the row decoder 122 may apply a verify voltage to the selected word line, and apply a verify pass voltage higher than the verify voltage to the unselected word lines.

In a read operation, the row decoder 122 may apply a read voltage to the selected word line, and apply a read pass voltage higher than the read voltage to the unselected word lines.

In an erase operation, the row decoder 122 may select one memory block according to a decoded address. In the erase operation, the row decoder 122 may apply a ground voltage to word lines connected to the selected memory block.

The page buffer group 123 may include first to nth page buffers PB1 to PBn. The first to nth page buffers PB1 to PBn may be connected to the memory cell array 110 respectively through first to nth bit lines BL1 to BLn. The first to nth page buffers PB1 to PBn may operate under the control of the control logic 130.

Specifically, the first to nth page buffers PB1 to PBn may operate in response to page buffer control signals PBSIG-NALS. For example, the first to nth page buffers PB1 to PBn may temporarily store data received through the first to nth bit lines BL1 to BLn, or sense a voltage or current of the bit lines BL1 to BLn in a read operation or a verify operation.

In a program operation, when the program voltage is applied to the selected word line, the first to nth page buffers PB1 to PBn may transfer data DATA received through the column decoder 124 and the input/output circuit 125 to selected memory cells through the first to nth bit lines BL1 to BLn. Memory cells of a selected page are programmed according to the transferred data DATA. A memory cell connected to a bit line to which a program allow voltage (e.g., a ground voltage) is applied may have an increased threshold voltage. A threshold voltage of a memory cell connected to a bit line to which a program inhibit voltage (e.g., a power voltage) is applied may be maintained.

In a verify operation, the first to nth page buffers PB1 to PBn may sense data stored in selected memory cells, from the selected memory cells through the first to nth bit lines BL1 to BLn.

In a read operation, the first to nth page buffers PB1 to PBn may sense data DATA from memory cells of a selected page through the first to nth bit lines BL1 to BLn, and output the sensed data DATA to the input/output circuit 125 under the control of the column decoder 124.

In an erase operation, the first to nth page buffers PB1 to PBn may float the first to nth bit lines BL1 to BLn.

The column decoder 124 may transfer data between the input/output circuit 125 and the page buffer group 123 in response to a column address CADD. For example, the column decoder 124 may exchange data with the page buffers PB1 to PBn through data lines DL, or exchange data with the input/output circuit 125 through column lines CL.

The input/output circuit 125 may transfer a command CMD and an address ADD, which are transferred from the memory controller 200, to the control logic 130, or exchange data DATA to the column decoder 124.

In a read operation or a verify operation, the sensing circuit 126 may generate a reference current in response to an allow bit VRY_BIT<#>, and output a pass signal PASS or a fail signal FAIL by comparing a sensing voltage VPB received from the page buffer group 123 with a reference voltage generated by the reference current.

The control logic 130 may control the peripheral circuit 120 by outputting the operation command OP_CMD, the row address RADD, the page buffer control signal PBSIG-NALS, and the allow bit VRY_BIT<#> in response to the command CMD and the address ADD.

Figure 15:
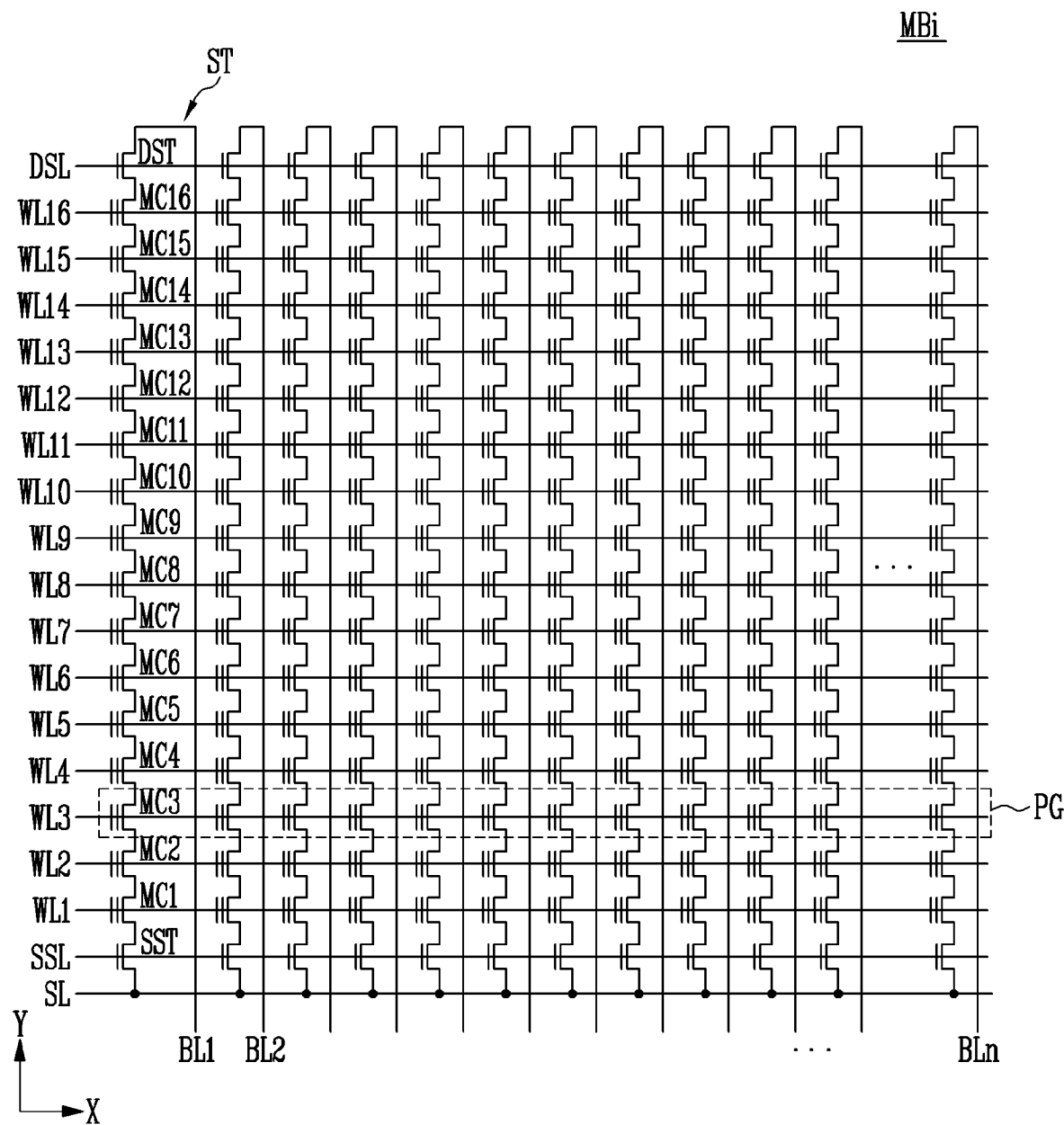
FIG. 15 is a diagram illustrating a memory block in accordance with an embodiment of the present disclosure.

FIG. 15 is a diagram illustrating a memory block in accordance with an embodiment of the present disclosure.

Referring to FIG. 15, a memory block MBi shown in FIG. 15 may be any one of the memory blocks MB1 to MBk shown in FIG. 14.

The memory block MBi may include a first select line, a second select line, a plurality of word lines WL1 to WL16, a source line SL, a plurality of bit lines BL1 to BLn, and a plurality of strings ST.

The first select line may be, for example, a source select line SSL. Hereinafter, it is assumed that the first select line is the source select line SSL.

The second select line may be, for example, a drain select line DSL. Hereinafter, it is assumed that the second select line is the drain select line DSL.

The plurality of word lines WL1 to WL16 may be arranged in parallel to each other between the source select line SSL and the drain select line DSL.

A number of the plurality of word lines WL1 to WL16 shown in FIG. 15 is merely illustrative, and the number of word lines in a string ST is not limited to the number shown in the drawings.

The plurality of strings ST may be commonly connected to the source line SL.

The plurality of bit lines BL1 to BLn may be respectively connected to the strings ST.

The plurality of strings ST may be connected to the bit lines BL1 to BLn respectively and may be connected to the source line SL.

A string ST connected to a first bit line BL1 in FIG. 15 will be described in detail as an example, however, it will be understood that the strings ST may be configured identically to one another.

The string ST may include a plurality of memory cells MC1 to MC16, at least one first select transistor, and at least one second select transistor.

The plurality of memory cells MC1 to MC16 may be connected in series to each other between a source select transistor SST and a drain select transistor DST.

Gates of the memory cells MC1 to MC16 may be respectively connected to the plurality of word lines WL1 to WL16. Therefore, a number of the plurality of memory cells MC1 to MC16 included in one string ST may be equal to that of the plurality of word lines WL1 to WL16.

Any one memory cell from among the plurality of memory cells MC1 to MC16 may be configured as, for example, any one of a single-level cell (SLC), the a multi-level cell (MLC), the a triple-level cell (TLC), and the a quad-level cell (QLC).

A group of memory cells connected to the same word line from among memory cells included in different strings ST may be referred to as a physical page PG. Therefore, the memory block MBi may include physical pages PG, which number in correspondence to a number of the word lines WL1 to WL16. Hereinafter, it is assumed that the memory cells (e.g., MC3) included in the physical page PG are selected memory cells.

The first select transistor may be, for example, the source select transistor SST. Hereinafter, it is assumed that the first select transistor is the source select transistor SST.

A first electrode of the source select transistor SST may be connected to the source line SL. A second electrode of the source select transistor SST may be connected to a first memory cell MC1 from among the plurality of memory cells MC1 to MC16. A gate electrode of the source select transistor SST may be connected to the source select line SSL.

The second select transistor may be, for example, the drain select transistor DST. Hereinafter, it is assumed that the second select transistor is the drain select transistor DST.

A first electrode of the drain select transistor DST may be connected to a sixteenth memory cell MC16 from among the plurality of memory cells MC1 to MC16. A second electrode of the drain select transistor DST may be connected to the first bit line BL1. A gate electrode of the drain select transistor DST may be connected to the drain select line DSL.

Figure 16:
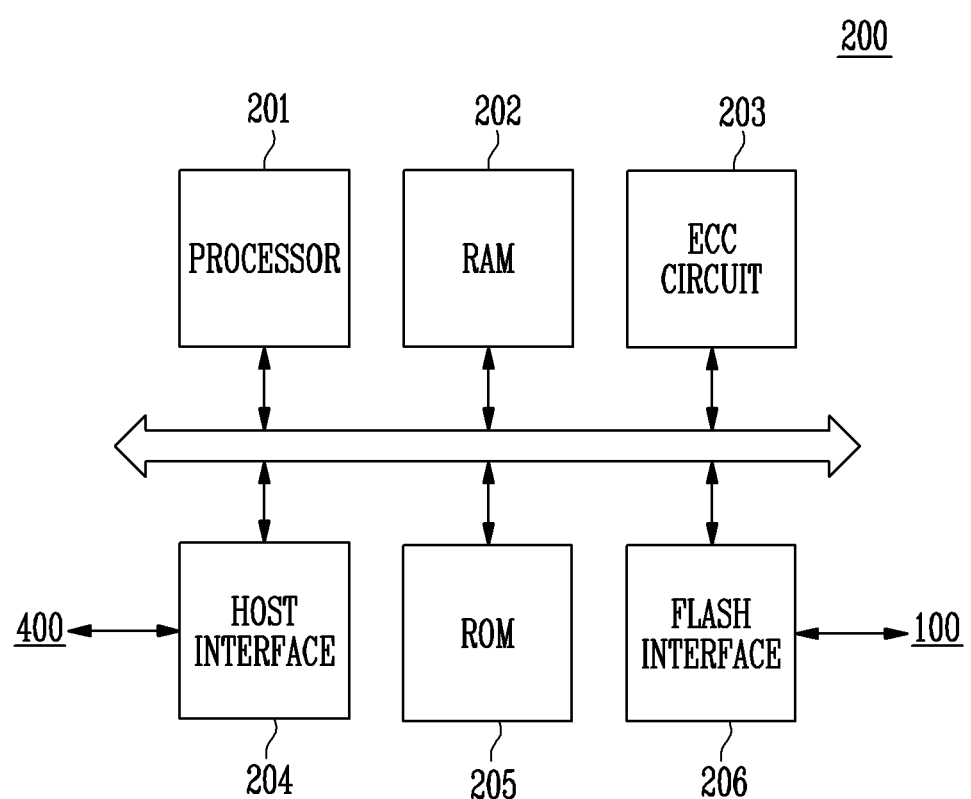
FIG. 16 is a diagram illustrating a memory controller in accordance with an embodiment of the present disclosure.

FIG. 16 is a diagram illustrating a memory controller in accordance with an embodiment of the present disclosure.

Referring to FIG. 16, a memory controller 200 may include a processor 201, a RAM 202, an error correction code (ECC) circuit 203, a host interface 204, a ROM 205, and a flash interface 206.

The processor 201 may control overall operations of the memory controller 200.

The RAM 202 may be used as a buffer memory, a cache memory, a working memory, etc. of the memory controller 200. For example, the RAM 202 may be a buffer memory.

The ECC circuit 203 may generate an ECC for correcting a fail bit or error bit of data received from the memory device 100.

The ECC circuit 203 may generate data to which a parity bit is added by performing ECC encoding of data provided to the memory device 100. The parity bit (not shown) may be stored in the memory device 100.

The ECC circuit 203 may perform ECC decoding on data output from the memory device 100. The ECC circuit 203 may correct an error by using a parity.

For example, the ECC circuit 203 may correct an error by using various coded modulations such as an LDPC code, a BCH code, a turbo code, a Reed-Solomon code, a convolution code, an RSC, a TCM, and a BCM.

The ECC circuit 203 may calculate an ECC value of data to be programmed to the memory device 100 in a program operation.

The ECC circuit 203 may perform an error correction operation on data read from the memory device 100 in a read operation, based on the ECC value.

The ECC circuit 203 may perform an error correction operation of data recovered from the memory device 100 in a recovery operation of data that fails.

The memory controller 200 may communicate with an external device (e.g., the host 400, an application processor, or the like) through the host interface 204.

The ROM 205 may store, in the form of firmware, various information required in an operation of the memory controller 200.

The memory controller 200 may communicate with the memory device 100 through the flash interface 206. The memory controller 200 may transmit a command CMD, an address ADDR, a control signal CTRL, and the like to the memory device 100 through the flash interface 206, and may receive data DATA.

The flash interface 206 may include, for example, a NAND interface.

Figure 17:
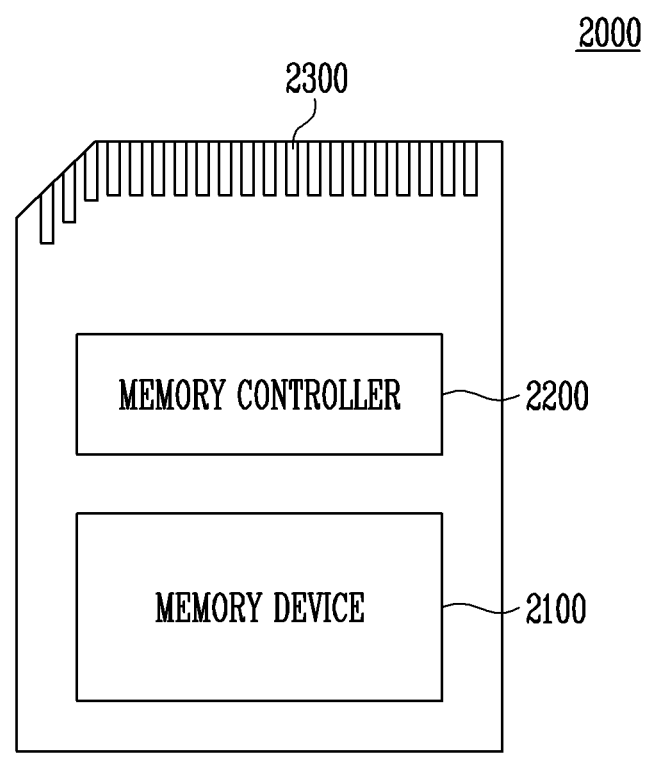
FIG. 17 is a block diagram illustrating a memory card system to which a storage device is applied in accordance with an embodiment of the present disclosure.

FIG. 17 is a block diagram illustrating a memory card system to which a storage device is applied in accordance with an embodiment of the present disclosure.

Referring to FIG. 17, a memory card system 2000 includes a memory device 2100, a memory controller 2200, and a connector 2300.

Exemplarily, the memory device 2100 may be implemented with various nonvolatile memory devices such as an Electrically Erasable and Programmable ROM (EEPROM), a NAND flash memory, a NOR flash memory, a Phase-change RAM (PRAM), a Resistive RAM (ReRAM), a Ferroelectric RAM (FRAM), and a Spin Torque Transfer magnetic RAM (STT-MRAM).

The memory controller 2200 is connected to the memory device 2100. The memory controller 2200 may access the memory device 2100. For example, the memory controller 2200 may control read, write, erase, and background operations of the memory device 2100. The memory controller 2200 provides an interface between the memory device 2100 and a host Host. The memory controller 2200 drives firmware for controlling the memory device 2100. The memory controller 2200 may be implemented identically to the memory controller 200 described with reference to FIG. 1.

Exemplarily, the memory controller 2200 may include components such as a Random Access Memory (RAM), a processing unit, a host interface, a memory interface, and an error corrector.

The memory controller 2200 may communicate with an external device through the connector 2300. The memory controller 2200 may communicate with the external device (e.g., the host 400) according to a specific communication protocol. For example, the memory controller 2200 may communicate with the external device through at least one of various communication protocols such as a Universal Serial Bus (USB), a Multi-Media Card (MMC), an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), FireWire, a Universal Flash Storage (UFS), Wi-Fi, Bluetooth, and NVMe. For example, the connector 2300 may be defined by at least one of the above-described various communication protocols.

The memory device 2100 and the memory controller 2200 may be integrated into a single semiconductor device, to constitute a memory card. For example, the memory controller 2200 and the memory device 2100 may constitute a memory card such as a PC card (Personal Computer Memory Card International Association (PCMCIA)), a Compact Flash (CF) card, a Smart Media Card (SM and SMC), a memory stick, a Multi-Media Card (MMC, RS-MMC, MMCmicro and eMMC), an SD card (SD, miniSD, microSD and SDHC), and a Universal Flash Storage (UFS).

Figure 18:
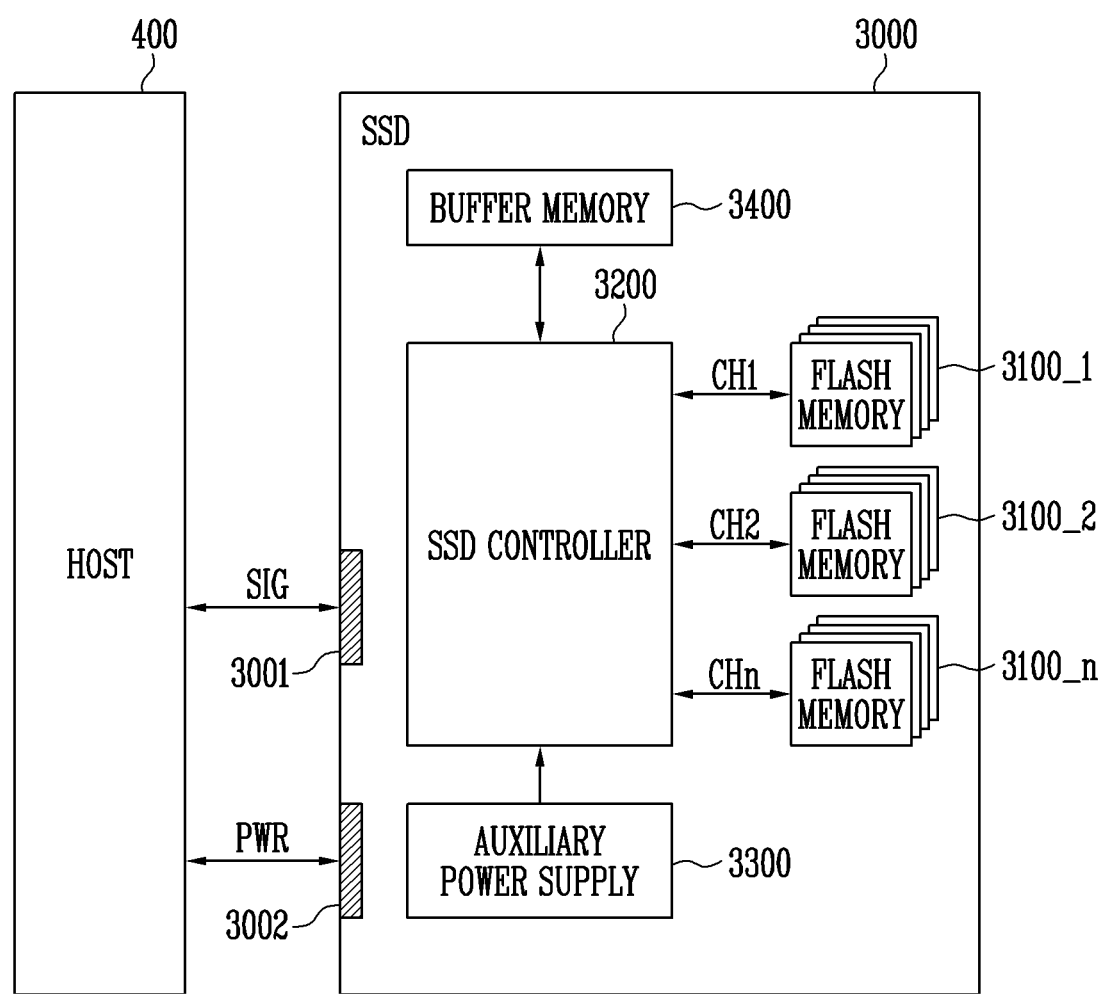
FIG. 18 is a block diagram illustrating a Solid State Drive (SSD) system to which a storage device is applied in accordance with an embodiment of the present disclosure.

FIG. 18 is a block diagram illustrating a Solid State Drive (SSD) system to which a storage device is applied in accordance with an embodiment of the present disclosure.

Referring to FIG. 18, an SSD system includes a host 400 and an SSD 3000.

The SSD 3000 exchanges a signal SIG with the host 400 through a signal connector 3001, and receives power PWR through a power connector 3002. The SSD 3000 includes an SSD controller 3200, a plurality of flash memories 3100_1, 3100_2, to 3100_n, an auxiliary power supply 3300, and a buffer memory 3400.

In accordance with an embodiment of the present disclosure, the SSD controller 3200 may perform the same function as the memory controller 200 described with reference to FIG. 1.

The SSD controller 3200 may control the plurality of flash memories 3100_1, 3100_2, to 3100_n in response to a signal SIG received from the host 400. For example, the signal SIG may be a signal based on an interface between the host 400 and the SSD 3000. For example, the signal SIG may be a signal defined by at least one of interfaces such as a Universal Serial Bus (USB), a Multi-Media Card (MMC), an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), a FireWire, a Universal Flash Storage (UFS), a WI-FI, a Bluetooth, and an NVMe.

The auxiliary power supply 3300 is connected to the host 400 through the power connector 3002. The auxiliary power device 3300 may receive the power PWR input from the host 400, and charge with the power PWR. When the supply of power from the host 400 is not smooth, the auxiliary power supply 3300 may provide the power of the SSD 3000. For example, the auxiliary power supply 3300 may be located in the SSD 3000, or be located at the outside of the SSD 3000. For example, the auxiliary power supply 3300 may be located on a main board, and provide auxiliary power to the SSD 3000.

The buffer memory 3400 may temporarily store data. For example, the buffer memory 3400 may temporarily store data received from the host 400 or data received from the plurality of flash memories 3100_1, 3100_2, to 3100_n, or temporarily store meta data (e.g., a mapping table) of the flash memories 3100_1, 3100_2, to 3100_n. The buffer memory 3400 may include volatile memories such as a DRAM, an SDRAM, a DDR SDRAM, an LPDDR SDRAM, and a GRAM or nonvolatile memories such as a FRAM, a ReRAM, an STT-MRAM, and a PRAM.

Figure 19:
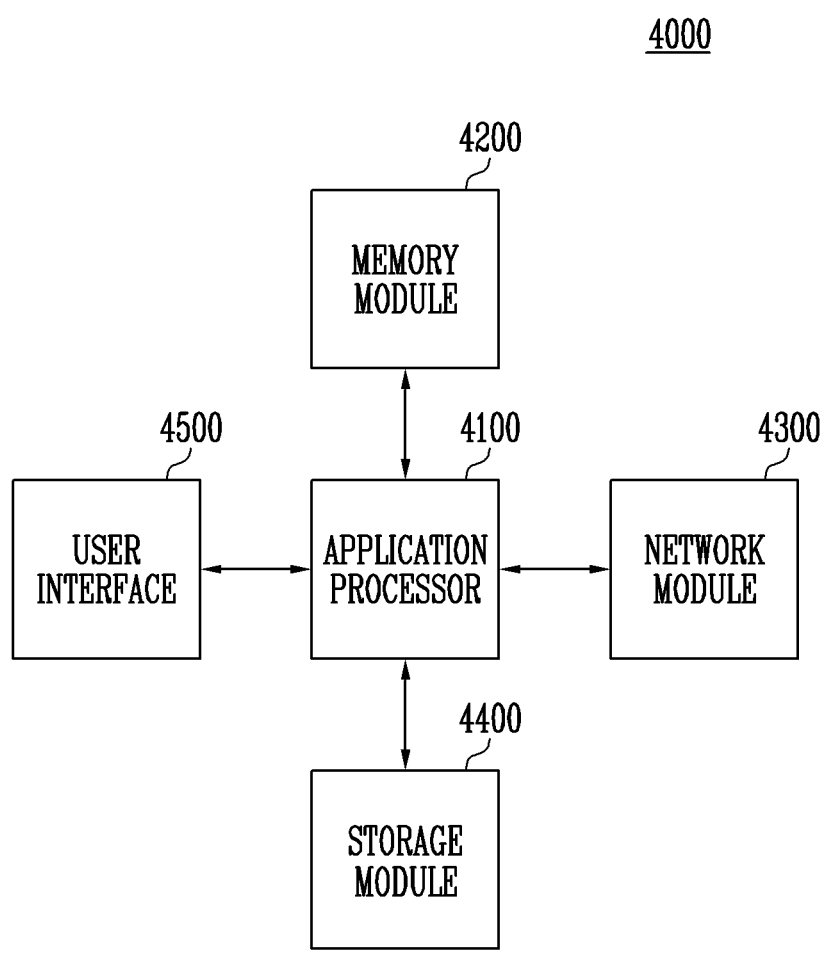
FIG. 19 is a block diagram illustrating a user system to which a storage device is applied in accordance with an embodiment of the present disclosure.

FIG. 19 is a block diagram illustrating a user system to which a storage device is applied in accordance with an embodiment of the present disclosure.

Referring to FIG. 19, a user system 4000 includes an application processor 4100, a memory module 4200, a network module 4300, a storage module 4400, and a user interface 4500.

The application processor 4100 may drive components included in the user system 4000, an operating system (OS), a user program, or the like. For example, the application processor 4100 may include controllers for controlling components included in the user system 4000, interfaces, a graphic engine, and the like. The application processor 4100 may be provided as a System-on-Chip (SoC).

The memory module 4200 may operate as a main memory, working memory, buffer memory or cache memory of the user system 4000. The memory module 4200 may include volatile random access memories such as a DRAM, an SDRAM, a DDR SDRAM, a DDR2 SDRM, a DDR3 SDRAM, an LPDDR SDRAM, an LPDDR2 SDRAM, and an LPDDR3 SDRAM or nonvolatile random access memories such as a PRAM, a ReRAM, an MRAM, and a FRAM. For example, the application processor 4100 and the memory module 4200 may be provided as one semiconductor package by being packaged based on a Package on Package (PoP).

The network module 4300 may communicate with external devices. For example, the network module 4300 may support wireless communications such as Code Division Multiple Access (CDMA), Global System for Mobile communication (GSM), Wideband CDMA (WCDMA), CDMA-2000, Time Division Multiple Access (TDMA), Long Term Evolution (LTE), Wimax, WLAN, UWB, Bluetooth, and Wi-Fi. Exemplarily, the network module 4300 may be included in the application processor 4100.

The storage module 4400 may store data. For example, the storage module 4400 may store data received from the application processor 4100. Alternatively, the storage module 4400 may transmit data stored therein to the application processor 4100. For example, the storage module 4400 may be implemented with a nonvolatile semiconductor memory device such as a Phase-change RAM (PRAM), a Magnetic RAM (MRAM), a Resistive RAM (RRAM), a NAND flash, a NOR flash, or a NAND flash having a three-dimensional structure. For example, the storage module 4400 may be provided as a removable drive such as a memory card of the user system 4000 or an external drive.

For example, the storage module 4400 may operate identically to the storage device 1000 described with reference to FIG. 1. The storage module 4400 may include a plurality of nonvolatile memory devices, and the plurality of nonvolatile memory devices may operate identically to the memory device 100 described with reference to FIG. 1.

The user interface 4500 may include interfaces for inputting data or commands to the application processor 4100 or outputting data to an external device. For example, the user interface 4500 may include user input interfaces such as a keyboard, a keypad, a button, a touch panel, a touch screen, a touch pad, a touch ball, a camera, a microphone, a gyroscope sensor, a vibration sensor and a piezoelectric element. The user interface 4500 may include user output interfaces such as a Liquid Crystal Display (LCD), an Organic Light Emitting Diode (OLED) display device, an Active Matrix OLED (AMOLED) display device, an LED, a speaker, and a monitor.

In accordance with the present disclosure, there can be provided a storage device capable of improving performance by decreasing a number of times memory blocks are checked to select a source block such as a victim block in a background operation such as garbage collection, and an operating method of the storage device.

While the present disclosure has been shown and described with reference to certain exemplary embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described exemplary embodiments but should be determined by not only the appended claims but also the equivalents thereof.

In the above-described embodiments, all steps may be selectively performed or part of the steps and may be omitted. In each embodiment, the steps are not necessarily performed in accordance with the described order and may be rearranged. The embodiments disclosed in this specification and drawings are only examples to facilitate an understanding of the present disclosure, and the present disclosure is not limited thereto. That is, it should be apparent to those skilled in the art that various modifications can be made on the basis of the technological scope of the present disclosure.

Meanwhile, the exemplary embodiments of the present disclosure have been described in the drawings and specification. Although specific terminologies are used here, those are only to explain the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein.

What is claimed is:

1. A storage device comprising:
a memory device including a plurality of user blocks for storing data and a system block for storing map data representing a mapping relationship between a logical address of the data and a physical address at which the data is stored;
a buffer memory configured to store a physical-to-logical table including mapping information regarding physical addresses, included in an open block from among the plurality of user blocks, and logical addresses that are allocated to the physical addresses in the open block; and
a memory controller configured to control the memory device to update the map data stored in the system block, after the logical addresses are all allocated, based on the mapping information in the physical-to-logical table, and configured to store the updated map data in the system block,
wherein the memory controller:
acquires an old mapping information of the logical addresses from the system block;
generates old block information that distinguishes old blocks, from other user blocks in the plurality of user blocks, having old data corresponding to the logical addresses according to the old mapping information; and
generates a non-candidate block information, based on the old block information, to flag user blocks to be excluded from use as a target block in a migration operation.

2. The storage device of claim 1, wherein the memory controller selects candidate blocks from among the plurality of user blocks based on the non-candidate block information, and controls the memory device to move valid data stored in a source block from among the candidate blocks to the target block.

3. The storage device of claim 2, wherein the buffer memory includes:
a map data storage configured to store the physical-to-logical table and a logical-to-physical table including map data from the system block; and
a meta data storage configured to store meta data including valid data information on valid data stored in the plurality of user blocks or erase number information on a number of times each of the plurality of user blocks is erased.

4. The storage device of claim 3, wherein the valid data information is valid page information, which is information representing a valid page number included in each of the plurality of user blocks, and
wherein the memory controller:
selects the candidate blocks from among the plurality of user blocks by using the non-candidate block information to exclude non-candidate blocks from among the plurality of user blocks; and
selects, as the source block, a candidate block having a valid page number that is smaller than a predetermined reference valid page number.

5. The storage device of claim 4, wherein the source block is a victim block selected in garbage collection from among the candidate blocks, and
the target block is a free block selected in the garbage collection from among the plurality of user blocks.

6. The storage device of claim 3, wherein the memory controller:
selects the candidate blocks from among the plurality of user blocks by using the non-candidate block information to exclude non-candidate blocks from among the plurality of user blocks; and
selects, as the source block, a candidate block having an erase number of times that is greater than a predetermined reference erase number of times.

7. The storage device of claim 6, wherein the source block is a user block from among the plurality of user blocks having a largest erase number of times in a wear leveling operation, and
the target block is a user block from among the plurality of user blocks having a smallest erase number of times in the wear leveling operation.

8. The storage device of claim 1, wherein the old block information is bitmap data representing, as one bit, whether each of the plurality of user blocks is an old block.

9. A method for operating a storage device including a memory device, a buffer memory, and a memory controller, the method comprising:
performing map update of updating map data stored in the memory device based on a physical-to-logical table stored in the buffer memory;
generating old block information using the physical-to-logical table and the updated map data to include information for distinguishing old blocks that are user blocks, in which old data corresponding to logical addresses from the physical-to-logical table stored, from other user blocks from among a plurality of user blocks included in the memory device; and generating non-candidate block information using the old block information for use in a migration operation of moving data stored in the plurality of user blocks.

10. The method of claim 9, wherein the performing of the map update includes:

allocating the logical addresses, in the physical-to-logical table, to physical addresses included in an open block from among the plurality of user blocks;

updating map data read by the memory device, based on the physical-to-logical table, after all of the logical addresses are allocated to the physical addresses included in the open block; and storing the updated map data in the memory device.

11. The method of claim 10, wherein the generating of the old block information includes:

acquiring old mapping information of the logical addresses from the memory device; and generating, as the old block information, information representing a user block that corresponds to an old block according to the old mapping information.

12. The method of claim 11, wherein, in the generating of the old block information, bitmap data representing, as one bit, whether each of the plurality of user blocks is an old block is generated.

13. The method of claim 9, further comprising:

determining candidate blocks from among the plurality of user blocks, based on the non-candidate block information, and selecting a source block from among the candidate blocks, based on meta data including valid data information, which is information on valid data stored in the plurality of user blocks or an erase number information, which is information on a number of times each of the plurality of user blocks is erased; and moving valid data stored in the source block to a target block.

14. The method of claim 13, wherein the selecting of the source block includes:

selecting the candidate blocks from among the plurality of user blocks by using the non-candidate block information to exclude non-candidate blocks from among the plurality of user blocks; and selecting, as the source block, a candidate block having a valid page number that is smaller than a predetermined reference valid page number among the plurality of user blocks.

15. The method of claim 13, wherein the selecting of the source block includes:

selecting the candidate blocks from among the plurality of user blocks by using the non-candidate block information to exclude non-candidate blocks from among the plurality of user blocks; and selecting, as the source block, a candidate block having an erase number of times that is greater than a predetermined reference erase number of times.

16. A storage device comprising:

a memory device including a plurality of user blocks for storing data and a system block for storing map data representing a mapping relationship between a logical address of the data and a physical address at which the data is stored; and a memory controller configured to generate old block information as information for identifying a user block, from among the plurality of user blocks, in which old data of logical addresses to be updated is stored, while a map update operation of updating the map data is being performed.

17. The storage device of claim 16, wherein the memory controller:

acquires old mapping information of the logical addresses from the system block;

generates the old block information according to the old mapping information; and generates a non-candidate block information representing information on user blocks excluded from a target of a migration operation of moving data stored in the plurality of user blocks, based on the old block information.

18. The storage device of claim 17, wherein the memory controller:

selects candidate blocks from among the plurality of user blocks, based on the non-candidate block information; and controls the memory device to move valid data stored in a source block from among the candidate blocks to a target block.

19. The storage device of claim 18, wherein the memory controller:

selects, as the candidate blocks, the other user blocks from among the plurality of user blocks that are not non-candidate blocks identified by the non-candidate block information; and selects, as the source block, a candidate block having a valid page number that is smaller than a predetermined reference valid page number based on information representing a valid page number included in each of the plurality of user blocks.

20. The storage device of claim 16, wherein the old block information is bitmap data representing, as one bit, whether each of the plurality of user blocks is an old block.

* * * * *